United States Patent
Kapelushnik

(10) Patent No.: US 12,300,432 B2
(45) Date of Patent: *May 13, 2025

(54) ELECTROCHEMICAL CELLS FOR HIGH DISCHARGE

(71) Applicant: Battarix Enterprises, LLC, Dover, DE (US)

(72) Inventor: Nir Kapelushnik, Ein Vered (IL)

(73) Assignee: Battarix Enterprises, LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,907

(22) Filed: May 3, 2024

(65) Prior Publication Data
US 2024/0290553 A1 Aug. 29, 2024

Related U.S. Application Data

(63) Continuation of application No. 18/137,570, filed on Apr. 21, 2023, now Pat. No. 12,002,621, which is a continuation of application No. 17/866,136, filed on Jul. 15, 2022, now Pat. No. 11,670,463, which is a continuation of application No. 16/495,549, filed as application No. PCT/IL2017/050445 on Apr. 12, 2017, now Pat. No. 11,398,356.

(60) Provisional application No. 62/338,889, filed on May 19, 2016.

(51) Int. Cl.
| | | |
|---|---|---|
| H01G 11/26 | (2013.01) | |
| H01M 4/13 | (2010.01) | |
| H01M 10/04 | (2006.01) | |
| H01M 10/05 | (2010.01) | |
| H01M 10/052 | (2010.01) | |
| H02J 7/00 | (2006.01) | |
| H01G 11/46 | (2013.01) | |
| H01G 11/56 | (2013.01) | |
| H01G 11/72 | (2013.01) | |

(52) U.S. Cl.
CPC .............. *H01G 11/26* (2013.01); *H01M 4/13* (2013.01); *H01M 10/0431* (2013.01); *H01M 10/052* (2013.01); *H02J 7/007* (2013.01); *H01G 11/46* (2013.01); *H01G 11/56* (2013.01); *H01G 11/72* (2013.01)

(58) Field of Classification Search
CPC .............. H01G 11/26; H01M 10/0431; H01M 10/052; H01M 4/13; H02J 7/007
USPC ................................ 361/502, 508, 516, 530
See application file for complete search history.

(56) References Cited

U.S. PATENT DOCUMENTS

| | | |
|---|---|---|
| 5,869,205 A | 2/1999 | Mick et al. |
| 5,935,728 A | 8/1999 | Spillman et al. |
| 6,235,422 B1 | 5/2001 | Kaplan et al. |
| 6,261,717 B1 | 7/2001 | Luo et al. |
| 6,342,317 B1 | 1/2002 | Patel et al. |

(Continued)

FOREIGN PATENT DOCUMENTS

| | | |
|---|---|---|
| CA | 2700912 | 3/2014 |
| CA | 2941316 | 10/2015 |

(Continued)

*Primary Examiner* — Arun Ramaswamy
(74) *Attorney, Agent, or Firm* — Blank Rome LLP

(57) ABSTRACT

Provided herein is an electrochemical cell designed for high current discharge, which includes a cathode strip, an anode strip, and at least two separator strips, being longitudinally stacked to form an electrodes set that is folded into segments.

21 Claims, 14 Drawing Sheets

(56) References Cited

U.S. PATENT DOCUMENTS

| | | |
|---|---|---|
| 6,410,187 B1 | 6/2002 | Luo et al. |
| 7,008,722 B2 | 3/2006 | Huang |
| 7,081,235 B2 | 7/2006 | Feddrix et al. |
| 7,341,803 B2 | 3/2008 | Huang et al. |
| 7,348,101 B2 | 3/2008 | Gozdz |
| 7,763,383 B2 | 7/2010 | Miyamoto et al. |
| 7,972,723 B2 | 7/2011 | Yamaguchi |
| 8,460,824 B2 | 6/2013 | Marple |
| 8,668,999 B2 | 3/2014 | Nunome et al. |
| 8,703,341 B2 | 4/2014 | Kagei et al. |
| 8,721,743 B2 | 5/2014 | Andrews et al. |
| 8,841,025 B2 | 9/2014 | Watanabe et al. |
| 9,040,196 B2 | 5/2015 | Kato et al. |
| 9,219,270 B2 | 12/2015 | Itoh |
| 9,219,271 B2 | 12/2015 | Kolosnitsyn et al. |
| 9,379,368 B2 | 6/2016 | Roumi |
| 10,593,911 B2 | 3/2020 | Weinstein et al. |
| 2003/0194607 A1 | 10/2003 | Huang |
| 2005/0233219 A1 | 10/2005 | Gozdz |
| 2008/0235944 A1* | 10/2008 | Miller ............... H01R 4/20 29/857 |
| 2008/0254368 A1 | 10/2008 | Ooyama |
| 2009/0022085 A1 | 1/2009 | Dankberg et al. |
| 2010/0053844 A1 | 3/2010 | Eilertsen |
| 2010/0291424 A1 | 11/2010 | Webber |
| 2012/0007708 A1 | 1/2012 | Holcomb |
| 2012/0007709 A1 | 3/2012 | Sakata et al. |
| 2013/0115493 A1 | 5/2013 | Fuhr et al. |
| 2015/0364753 A1 | 12/2015 | Chiang |
| 2015/0371786 A1 | 12/2015 | Yang |
| 2016/0240325 A1 | 8/2016 | Tajima |
| 2016/0343999 A1 | 11/2016 | Yonemura |
| 2017/0110725 A1 | 4/2017 | Sakumoto et al. |
| 2018/0108496 A1 | 4/2018 | Venkateswaran |

FOREIGN PATENT DOCUMENTS

| | | |
|---|---|---|
| EP | 2141760 | 11/2013 |
| WO | WO 2002017414 | 2/2002 |
| WO | WO 2004027894 | 4/2004 |
| WO | WO 2012034042 | 3/2012 |
| WO | WO 2016014554 | 1/2016 |

* cited by examiner

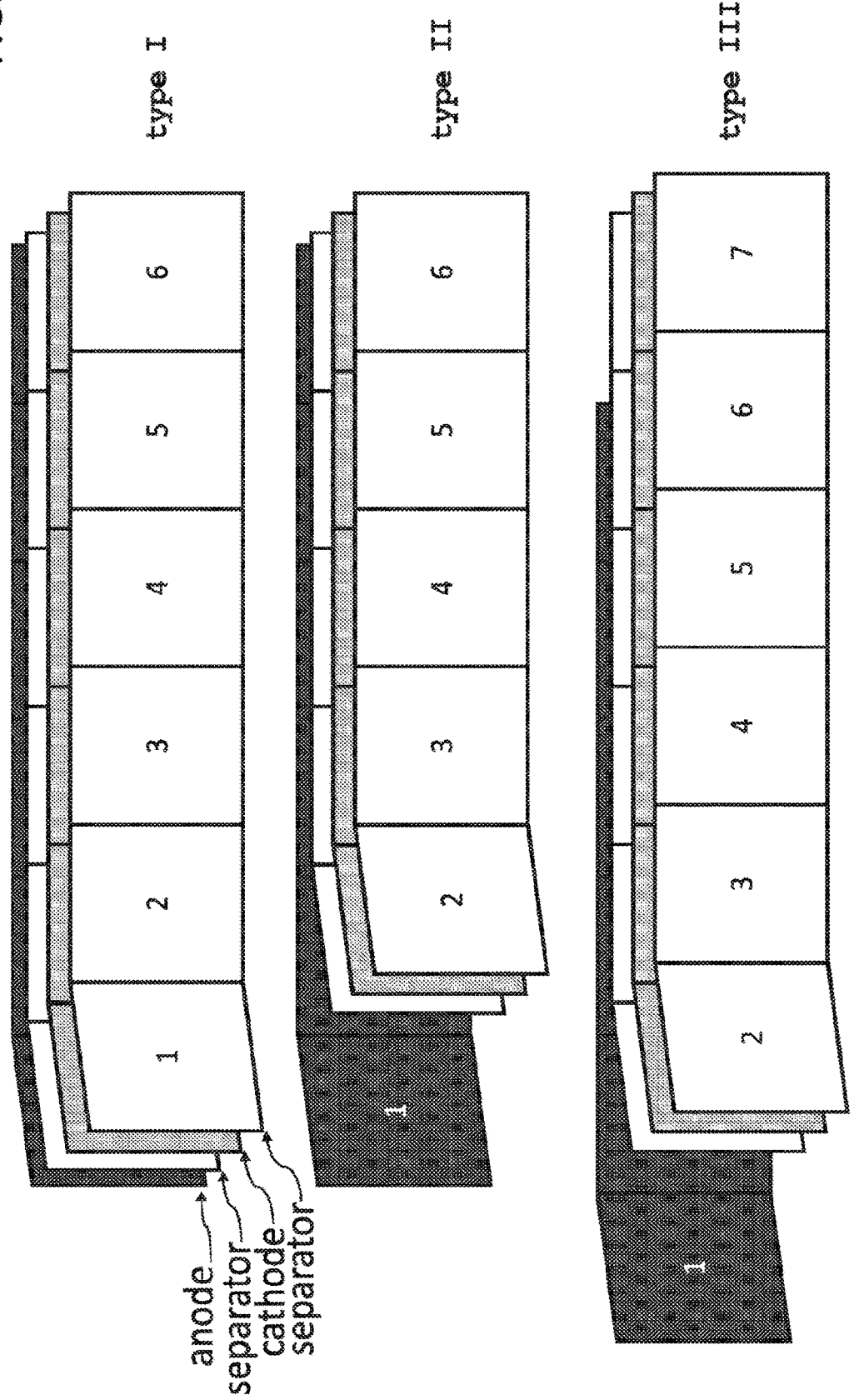

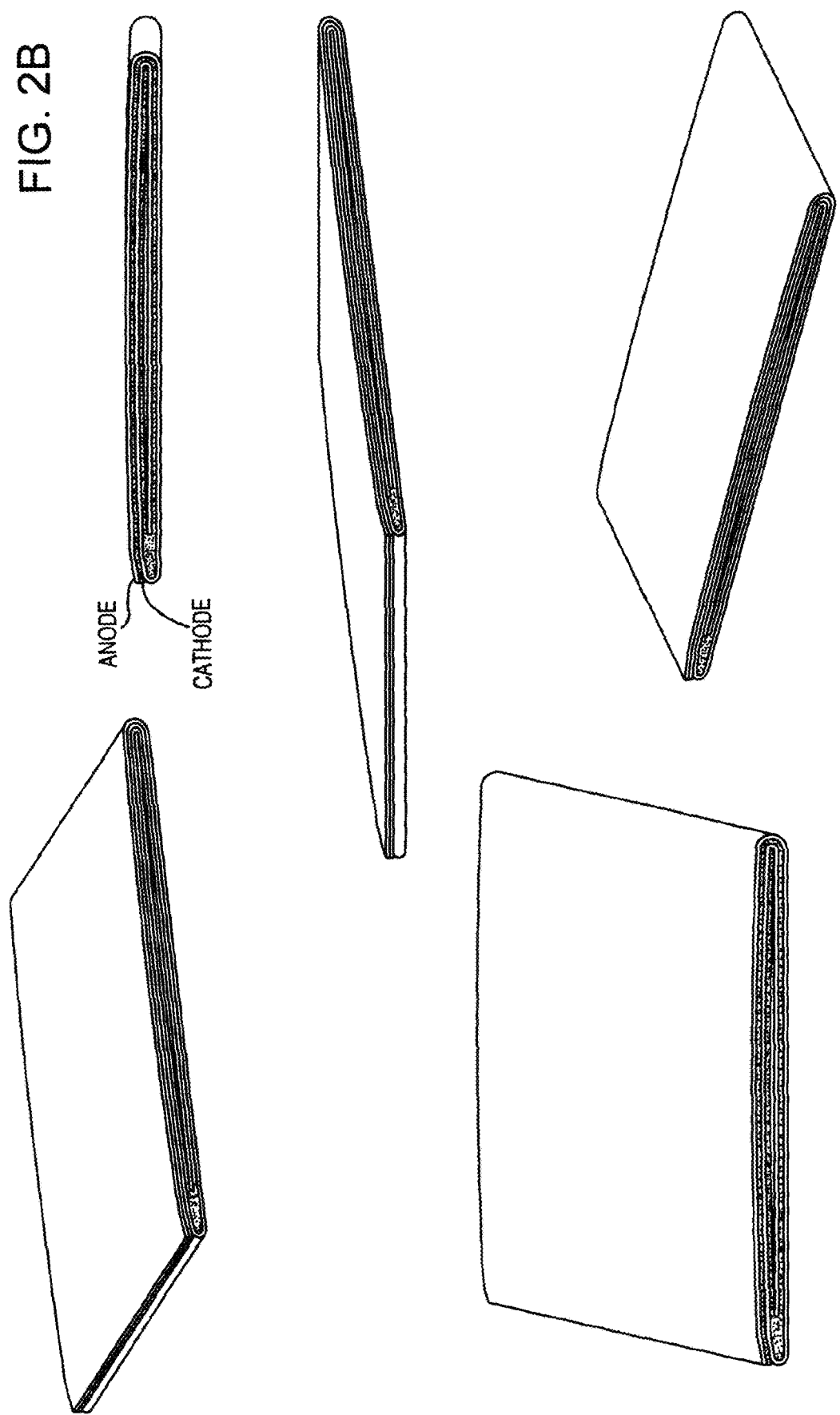

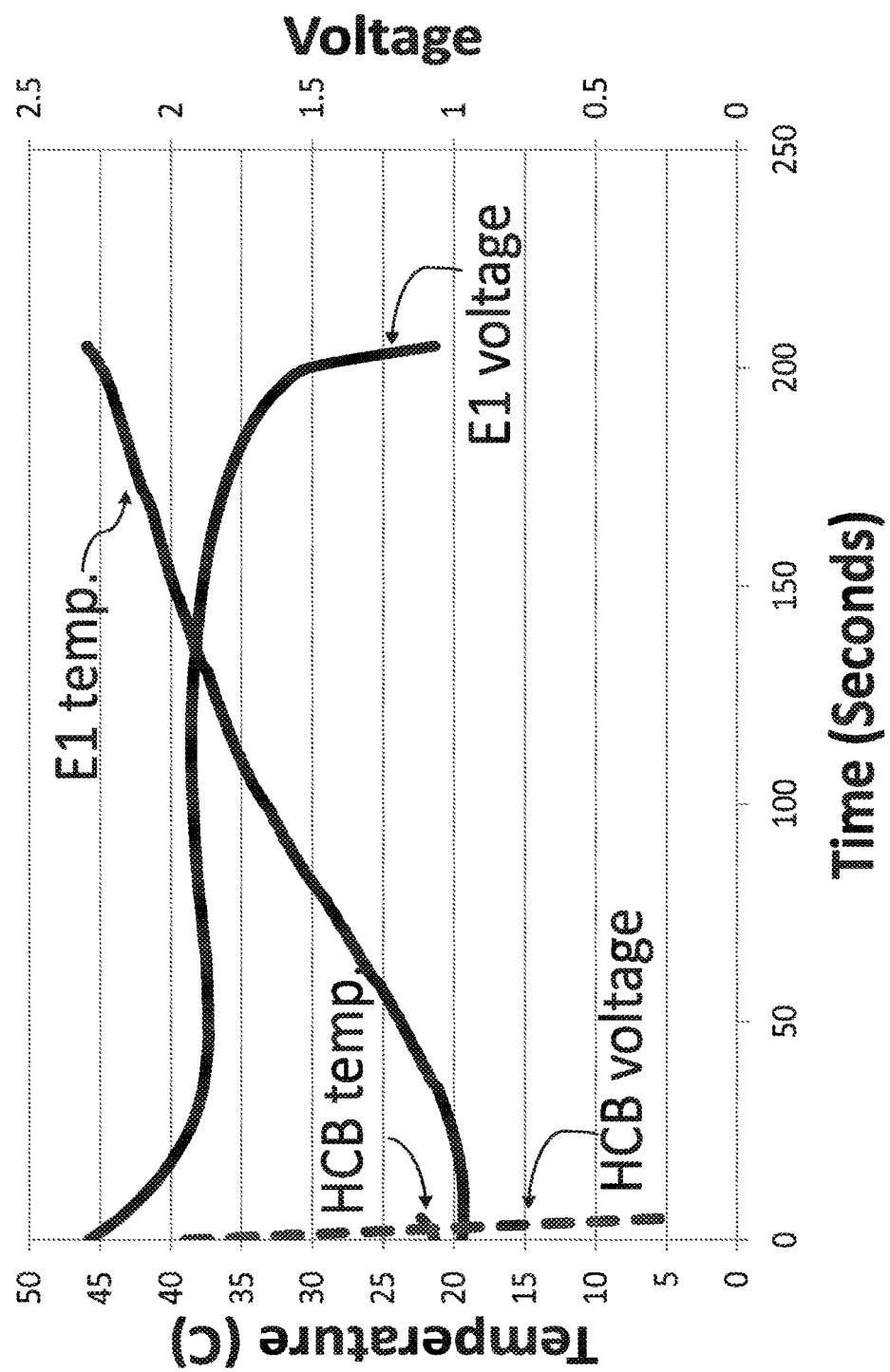

ELECTROCHEMICAL CELLS FOR HIGH DISCHARGE

RELATED APPLICATIONS

This application is a continuation application of U.S. application Ser. No. 18/137,570, filed Apr. 21, 2023, which is a continuation application of U.S. application Ser. No. 17/866,136, filed Jul. 15, 2022, now U.S. Pat. No. 11,670,463, which is a continuation application of U.S. application Ser. No. 16/495,549, filed Sep. 19, 2019, now U.S. Pat. No. 11,398,356, which is based on national stage application under 35 U.S.C. § 371 of PCT application PCT/IL2017/050445, filed Apr. 12, 2017, which claims the benefit of priority of U.S. Provisional Patent Application No. 62/338,889, filed May 19, 2016, the contents of each of which are incorporated herein by reference in their entirety.

FIELD AND BACKGROUND OF THE INVENTION

The present invention, in some embodiments thereof, relates to electrochemical cells, and more particularly, but not exclusively, to electrochemical cells and batteries with high discharge efficiency at high discharge rate and power, and methods of preparing the same.

Many contemporary applications in consumer and industrial electronics are based on portable power sources in the form of batteries. Most modern consumer electronic devices use secondary (rechargeable) electrochemical cells, which require charging by high power output charging devices. Together with the growing use of such portable electronic devices, there is an ever growing need for means of portable recharging. Preferably, recharging devices fulfil their purpose at a minimal period of time, which means they work under high load condition.

High specific energy, long storage life and instant readiness give primary cells a unique advantage as portable recharging devices over other portable power sources; they can be carried to remote locations and used instantly, even after long storage; they are also readily available, cheaper and more environmentally friendly when disposed. However, specific energy only indicates the capacity a cell can hold and does not indicate power delivery efficiency (discharge efficiency), a weakness with most primary cells when used under high load (high discharge rate and power) conditions. Manufacturers of primary batteries publish/specify specific energy, while specific power is seldom published. While most secondary batteries are rated at a C-rate of 1 (1 C discharge current) and even 20 C and 40 C, the capacity on consumer-grade primary batteries is measured with a very low current of 25 mA. In addition, the batteries are allowed to discharge from the nominal 1.5 V for alkaline to 0.8 V before deemed fully discharged. This provides impressive readings on paper, but the results are less favorable when applying loads that draw higher currents. Thus, the problem of using primary electrochemical cells and batteries in portable recharging devices lies in their limited performance under high load conditions, meaning that they can deliver their stored energy either at a low discharge (drain) rate and/or can deliver only some of the energy stored therein at a high discharge (drain) rate.

There are many factors that contribute to the discharge efficiency of batteries and the cells they contain. One of the reasons for low performance under high load conditions is the high internal resistance of primary batteries, which causes the voltage to collapse. Resistance determines how well electrical current flows through a material or device and is measured in ohms ($\Omega$), and in the context of electrochemical cells, resistance linked to the internal voltage drop and internal energy losses to heat. As the battery depletes on discharge, the already elevated resistance increases further. For example, digital cameras with primary batteries are borderline cases, and a power tool on alkaline would be impractical. A spent alkaline in a digital camera often leaves enough energy to run the kitchen clock for two years. The parameters that govern performance under load conditions include specific electrical power (current times voltage per mass, measured in W/kg) and/or specific energy (capacity time voltage per mass, measured in Wh/kg).

One factor that has been known for years to affect discharge efficiency is the interfacial surface area between the electrodes. Increasing the interfacial surface area generally has positive effects on current density, internal resistance, concentration polarization, and other characteristics that can affect discharge efficiency. In the past, electrode interfacial surface area has been increased in various ways, including the use of irregular interfacial electrode surfaces, and multiple cavities for one electrode contained within the other. Examples of such cell designs are found in U.S. Pat. Nos. 6,410,187, 6,342,317, 6,261,717, 6,235,422, 5,869,205, and International Patent Publication No. WO/2002/017414. Spirally wound electrode designs have also been used in cells to emphasize electrode interfacial surface area in order to enhance efficiency and capacity when discharged at high rate. However, as known in the art, the effect of increasing interfacial surface area is beneficial only to a certain level.

The relationship between cell capacity and current delivery is best illustrated with the Ragone Chart, named after David V. Ragone. The Ragone chart is used as a tool for assessing discharge efficiency; it evaluates an energy storage device on energy and power, wherein energy (Ah) presents the available storage capacity of a cell that is responsible for the runtime, and power (W) governs the load current. It can thus be said that a given electrochemical cell is defined by a characteristic Ragone chart. As can be seen in a Ragone chart drawn a given electrochemical cell, e.g., lithium metal cells, while increasing interfacial surface area is expected to increase its power for a given electrode material mass, this increase in power comes at the expense of the energy transfer efficiency, meaning that less of the stored energy passes from the cell to the target.

For portable recharging purposes, one of the most suitable electrochemistry in
   terms of specific energy is found in a primary lithium metal-based cell, which offer high energy or high power density, long shelf life, and a wide temperature range. Naturally, lithium batteries have attracted significant interest as secondary (rechargeable) power source; however, with commonly used electrolytes these batteries suffer from dendrite formation during charging, oftentimes resulting in cell failures and creating an unacceptable safety risk. Therefore, lithium metal batteries are generally sold as primary batteries. The chemistry used in lithium metal cells is based on a lithium metal anode (lithium metal negative electrode), while using various cathode materials and electrolytes. Modifying the cathode and/or the electrolyte has a notable effect on the performance of the battery. Over the years, a wide range of cathode materials have been investigated for use in lithium metal batteries.

Due to various considerations, including cost, stability, safety, performance and interaction with the electrolyte, only a relative few cathode materials have been commercialized in primary lithium batteries, wherein the most significant and broadly used is Li/MnO$_2$ battery technology. Lithium/manganese dioxide (Li/MnO$_2$) battery is one of the first lithium/solid-cathode systems to be commercialized and is considered as the most widely used primary lithium battery. It is available in many configurations which include a thin layered configuration, coin-shaped, bobbin-shaped, spirally wound and wrapped cylindrical cells, and prismatic configurations in multi-cell batteries, and in designs for low, moderate, and moderately high drain applications. At the high end, the capacity of such commercially available batteries goes up to 2.5 Ah. Larger sized batteries are available for special applications and have been introduced commercially.

The attractive properties of Li/MnO$_2$ batteries include a high cell voltage (nominal voltage 3 V), specific energy above 230 Wh/kg and an energy density above 535 Wh/L. These parameters depend on the specific cell design and the targeted application. The cell is known for its good performance over a wide temperature range, long shelf life, wide storage temperature range, and a low cost. Li/MnO$_2$ batteries are used in long-term memory backup, safety and security devices, cameras, many consumer devices and in military electronics.

Flexible primary lithium metal batteries have emerging and well-established applications such as smart cards, RFID, and various "internet of things" (IOT) applications. Currently, primary Li/MnO$_2$ batteries have energy densities ranging from about 100 to about 700 W-h/L, depending on the size of the battery (smaller batteries will have lower capacity due to the higher fraction of the battery taken up by inactive components such as the packaging). They also offer shelf life of up to five years, and can discharge up to C-rate of C/2 (meaning continuously discharge the cell over two hours), although regularly the producer recommend to discharge the cell in a lower current. For example, a discharge current of 200 mA (about C-rate of C/4) in a typical Li/MnO$_2$ battery would utilize 60% of the capacity record from a cell being discharged at 1 mA.

U.S. Pat. No. 7,341,803 discloses an alkaline battery cell with improved high rate and high power discharge capacity without sacrificing capacity at low rate and low power, which is achieved by adding at least a second anode or cathode, reducing the effective maximum electrode thicknesses, and increasing the active material density in one or more electrodes.

EP 2141760 teaches an electrode for an energy storage device, comprising an electrode bearer and an active electrode material which is applied onto one or both sides of the electrode bearer, wherein the electrode bearer is made from an alloy having a percentage of copper which constitutes the largest percentage of the alloy by weight, and wherein said alloy additionally contains at least tin at a content of at least 0.01% by weight, characterized in that the alloy comprises mixed crystals containing copper and tin in a plurality of crystal lattices, in which copper atoms form a preferred crystal lattice shape in which tin atoms replace copper atoms in said crystal lattice and effect a distortion of the copper atom lattice.

U.S. Pat. No. 8,668,999 discloses a lithium primary battery that includes an electrode group in which a positive electrode is having iron disulfide as a positive electrode active material and a negative electrode is having lithium as a negative electrode active material are wound, with a separator interposed between the positive electrode and the negative electrode, wherein a density of the iron disulfide in a positive electrode mixture containing the positive electrode active material is in a range of 2.2-2.9 g/cm$^3$, and the separator is made of a non-woven fabric whose tensile strength is in a range of 6-30 N/mm$^2$.

U.S. Pat. No. 9,219,271 provides a solid composite electrode formed by the deposition of an electrode composition (slurry) onto a current collector in one or many layers, wherein the electrode structure is characterized by a porosity of the electrode composition layer that decreases in a direction from the back side of the layer (close to the current collector) towards the outer side of the layer. The electrode structures can be used in primary (non-rechargeable) and secondary (rechargeable) batteries.

WO/2004/027894 provides an electrochemical battery cell having a high electrode interfacial surface area to improve high rate discharge capacity, wherein the interfacial surfaces of the solid body electrodes have radially extending lobes that increase the interfacial surface area; the lobes do not have sharp corners, and the concave areas formed between the lobes are wide open, to facilitate assembly of the separator and insertion of the other electrode into the concave areas without leaving voids between the separator and either electrode.

U.S. Pat. No. 8,721,743 discloses a method of making a battery that includes passing a mandrel through an opening defined by a pellet that includes an electrode composition, wherein the mandrel is having a transverse cross-section with a first dimension and a second dimension that is larger than the first dimension.

U.S. Pat. No. 9,379,368 provides electrochemical systems with electronically and ionically conductive layers that have electronic, mechanical and chemical properties useful for a variety of applications including electrochemical storage and conversion, wherein electronically conductive layers are introduced between an electrode and the separator without producing any direct electronic path between the opposite electrodes.

WO/2012/034042 discloses a three-dimensional electrode array for use in electrochemical cells, fuel cells, capacitors, supercapacitors, flow batteries, metal-air batteries and semi-solid batteries, wherein the three-dimensional electrode array comprises a plurality of plate electrodes, wherein each plate electrode includes an array of apertures, wherein the plate electrodes are arranged in a substantially parallel orientation such that the each aperture of an individual plate electrode is aligned along an alignment axis passing through an aperture of each of all other plate electrodes; and a plurality of rod electrodes, wherein the plurality of rod electrode are not in physical contact with the plurality of plate electrodes and arranged such that each rod electrode extends a length along an alignment axis passing through an aperture of each plate electrode; and wherein a first surface area includes a cumulative surface area the plurality of plate electrodes, wherein a second surface area includes a cumulative surface area of each aperture array and wherein a third surface area includes a cumulative surface area of each of the plurality of rod electrodes.

Additional prior art documents include U.S. Patent Application Publication Nos. 2009/022085, 2010/0183916, 2012/0077089, 2012/0077090 and 2013/0115493, and U.S. Pat. Nos. 5,935,728, 7,081,235, 7,972,723, 7,763,383, 8,703, 341, 9,040,196 and 9,219,270.

In addition to adversely affecting capacity at lower discharge rate and power, the above approaches to improving discharge efficiency may have one or more additional drawbacks, such as more complex cell designs, more difficult manufacturing processes, increased manufacturing variability, higher scrap, greater susceptibility to quality problems, and increased manufacturing costs. The above approaches may also be difficult to adapt to existing cell designs, processes, and equipment, requiring large capital expenditures for commercialization.

It is evident that art is effluent with attempts to improve the efficiency of primary electrochemical cells, however none has achieved a configuration in which the internal resistance of the cell is sufficiently reduced to afford a high rate of discharge (high-drain) suitable for and required by many contemporary electronic applications.

SUMMARY OF THE INVENTION

As demonstrated in the Examples section below, the present inventors have successfully constructed a high energy Li/MnO$_2$ cell that is able to deliver a surprisingly high percent of its stored energy at high power demand, which is made possible by structural configuration that acts like it has an internal boost-generator, due most probably to better thermal preservation of core heat, afforded by multiple thin strip electrodes over-folding (flattened jellyroll). The excellent high drain-rate performance of the cell reflects the folded design of the cell with basically each anode and cathode being folded into at least 4 segments, and also the cathode thickness that maintains a low capacity-to-active area ratio of less than about 12 mAh/cm$^2$ or less than about 195E-6 arbitrary length units. This low volume-to-active area ratio can be achieved with cathodes (and anodes) of less than 400 micron, preferably less than 200 microns or as thin as 50 microns. The amount of the anode active material corresponds to the amount of the cathode active material, while optionally making one material be in excess over the other, and the shape of the anode should commensurate the geometric active area of the cathode, thereby providing sufficient charged species needed for the formation of the analogues Li$_x$MnO$_2$.

According to an aspect of some embodiments of the present invention, there is provided a electrochemical cell, comprising a cathode strip, an anode strip, and at least two separator strips, the anode, the cathode and the separators are longitudinally stacked to form an electrodes set having at least one of the separators disposed at least between an active area of the cathode and the anode, and the electrodes set is folded over itself to form segments, wherein:
a ratio of a nominal capacity of the cell to the active area is lower than 12 mAh/cm$^2$, and
the electrodes set is folded into at least 4 segments;
the cell is characterized by a discharge efficiency at room temperature of at least 30% to a cut-off voltage of ⅔ of an original voltage at a discharge current of 1,250 mA.

In some embodiments, the ratio mass equivalent of the anode to the cathode ranges from 1.5 to 0.9.

In some embodiments, the thickness of the cathode is less than 200 micron.

In some embodiments, the width of the electrodes set ranges from 60 mm to 20 mm.

In some embodiments, the electrodes set is folded in a flattened jellyroll configuration.

In some embodiments, each of the segments is substantially rectangular, and an inner segment consists of the anode.

In some embodiments, the electrodes set is folded into at least 5 segments.

In some embodiments, the nominal capacity of the cell is 775±25 mAh.

In some embodiments, the cell presented herein encased in a sealed container. In some embodiments, the container is a flexible pouch.

In some embodiments, the container is heat insulating.

In some embodiments, the cell presented herein is a primary cell.

In some embodiments, the anode active material is selected from the group consisting of a lithium, aluminum, silicon, carbon, zinc, and alloys and combinations thereof.

In some embodiments, the cathode active material is selected from the group consisting of MnO$_2$, FeS$_2$, CoO$_2$, NiMnCoO$_2$, FePO$_4$, NiCoAlO$_2$, Ti$_5$O$_{12}$, and CF$_x$ (mono fluorinated carbon).

According to another aspect of some embodiments of the present invention, there is provided an electrochemical cell that includes a cathode strip, an anode strip, and two separator strips, the anode, the cathode and the separators are longitudinally stacked to form an electrodes set having one of the separators disposed at each side of an active area of the cathode, and the electrodes set is folded over itself to form segments, wherein:
a ratio of a nominal capacity of the cell to the active area ranges from 12 mAh/cm$^2$ to 5 mAh/cm$^2$,
the electrodes set is folded in a flattened jellyroll configuration into 4 segments; the cell is characterized by a discharge efficiency at room temperature of at least 30% to a cut-off voltage of ⅔ of an original voltage at a discharge current of 1,250 mA.

In some embodiments, the nominal capacity of the cell is at least 775±25 mAh.

In some embodiments, the anode is folded into 4 substantially rectangular segments and the cathode is folded into 3 substantially rectangular segments and an inner segment is an anode segment.

In some embodiments, the thickness of the cathode is 200±5 microns or less.

In some embodiments, the length of the cathode is at least 110±2 mm and a width of the cathode is 40±2 mm.

In some embodiments, the ratio mass equivalent of the anode to the cathode ranges from 1.5 to 0.9.

In some embodiments, the thickness of the anode is 130±5 microns or less.

In some embodiments, the anode active material is lithium.

In some embodiments, the cathode active material is MnO$_2$.

In some embodiments, the cell presented herein is sealed in a heat insulating material.

According to another aspect of some embodiments of the present invention, there is provided an electric power storage device that includes at least one electrochemical cell as presented herein.

In some embodiments, the electric power storage device further includes at least two contact terminals in direct conductive communication with each of the anode and the cathode.

In some embodiments, the electric power storage device further includes an electric connector in direct communication with the terminals.

In some embodiments, the connector is a USB connector.

In some embodiments, the electric power storage device presented herein is configured for charging a secondary battery of a portable electronic device.

In some embodiments, the electric power storage device presented herein has a nominal capacity of at least 750 mAh.

In some embodiments, the secondary battery is rechargeable at a current of at least 1,000 mAh.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings and images. With specific reference now to the drawings and images in detail, it is stressed that the particulars shown are by way of example and for purposes of illustrative discussion of embodiments of the invention. In this regard, the description taken with the drawings and images makes apparent to those skilled in the art how embodiments of the invention may be practiced.

In the Drawings

FIG. 1A presents a schematic illustration of three optional stacking and segment arrangement in electrodes set alternatives, according to some embodiments of the present invention, wherein the numbers represent segment count by which the electrodes set is folded;

Figure 2A:
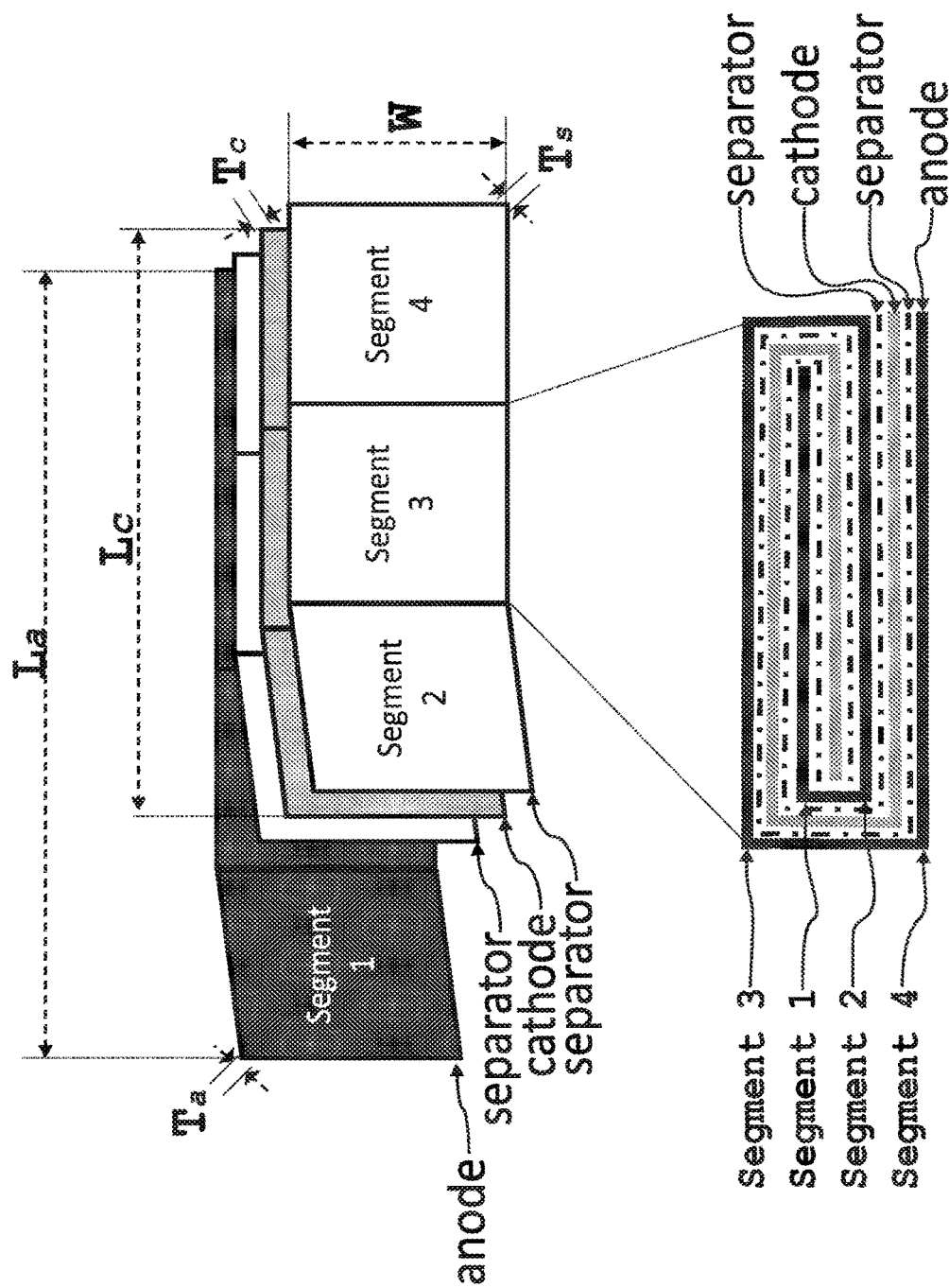
FIG. 2A is a schematic diagram of Embodiment-1 (E1) cell, an exemplary electrochemical cell constructed according to some embodiments of the present invention, showing at the top part the stacking order of the unfolded electrodes set, and showing at the bottom part a cross-section side view the folded electrodes set having a flattened jellyroll configuration.
Figure 3:
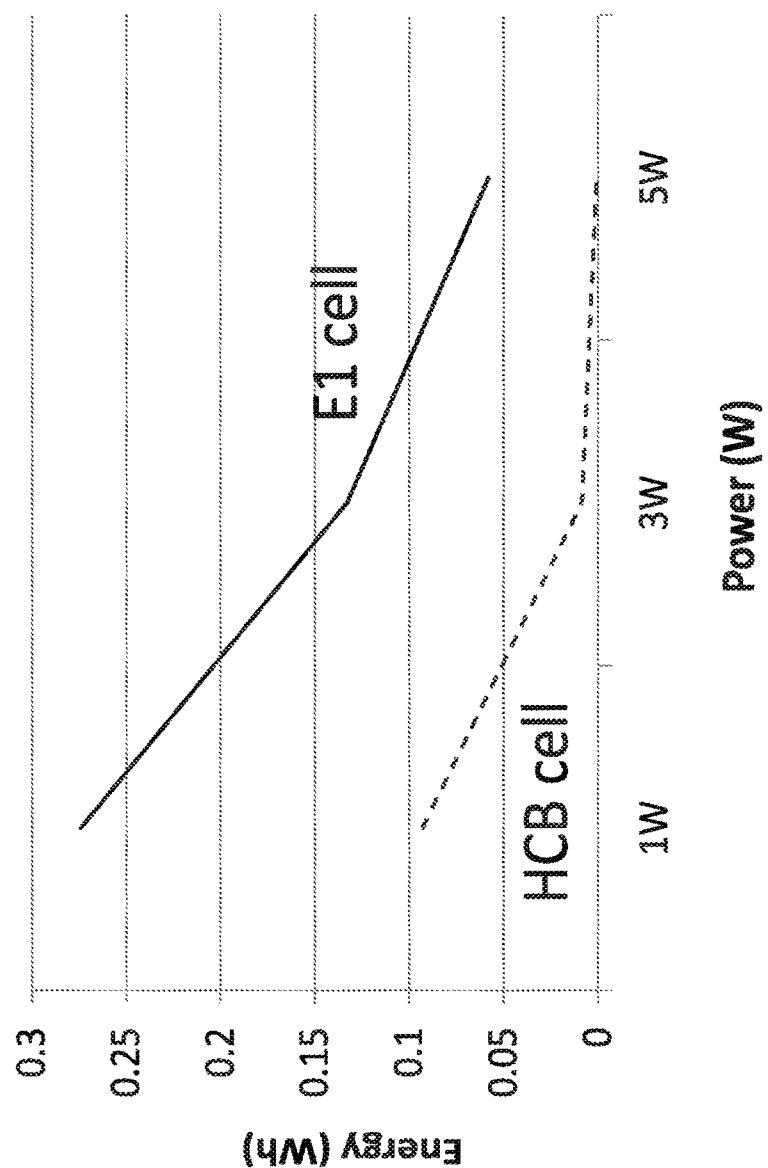
Figure 4A:
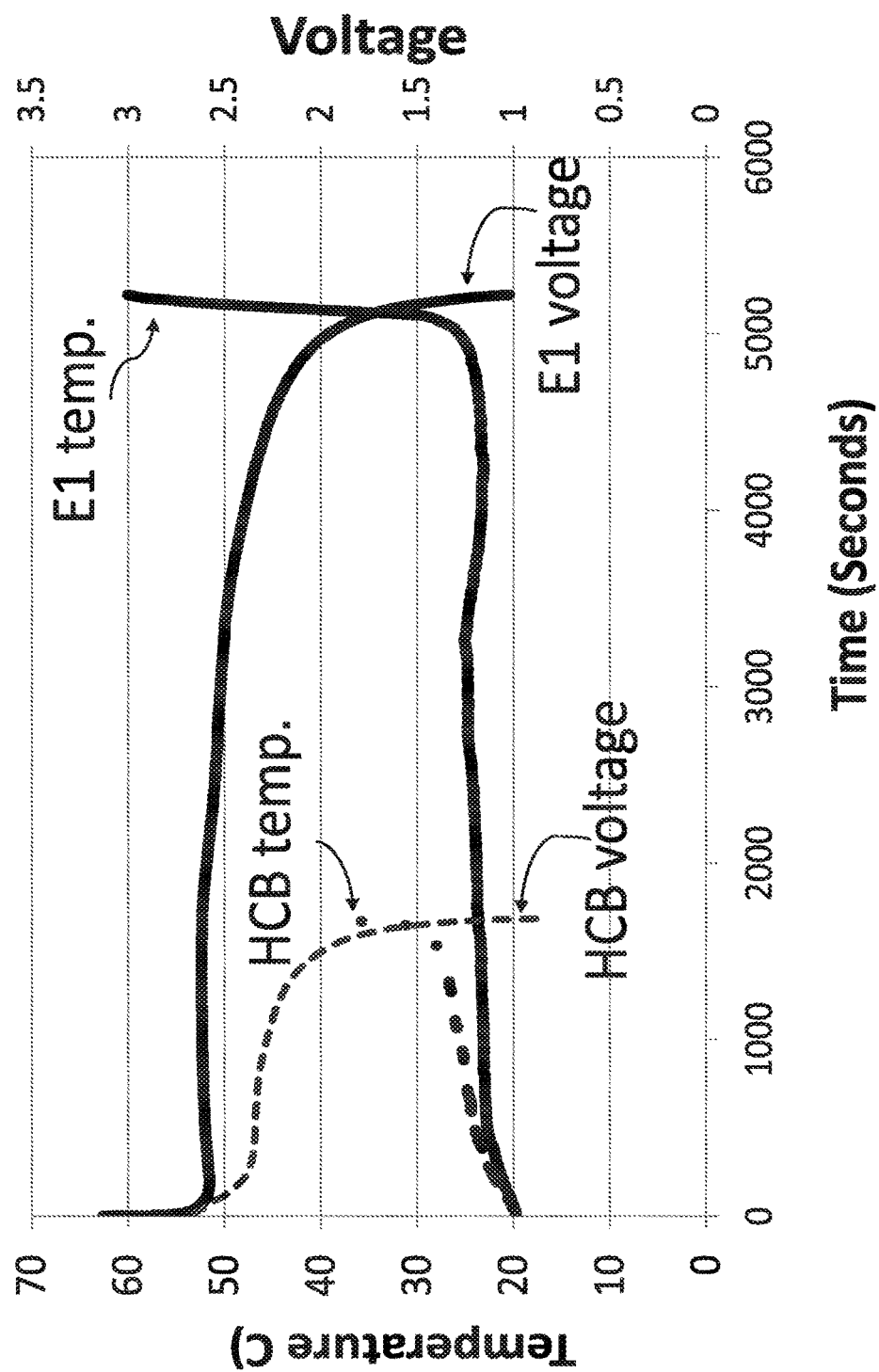
Figure 4B:
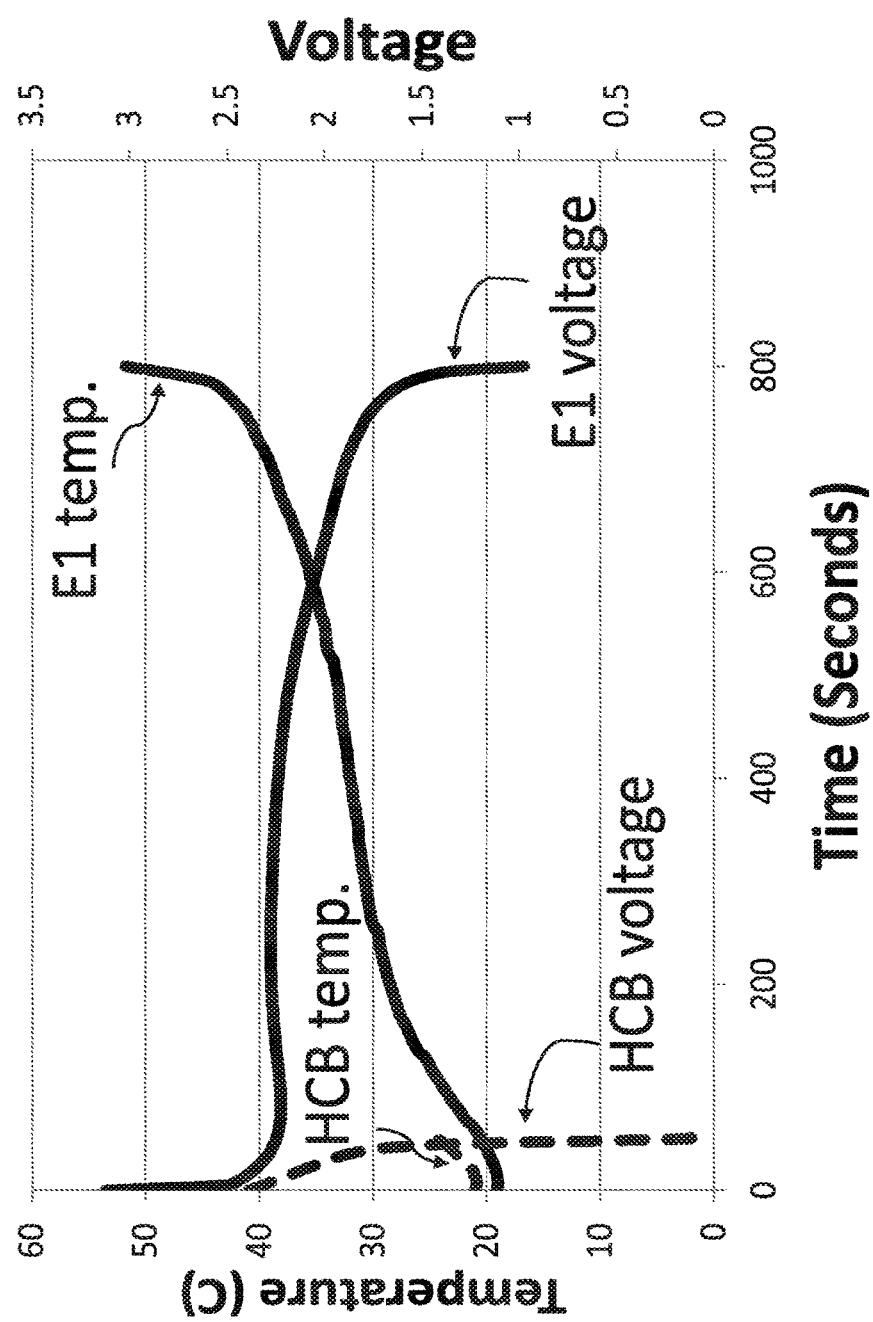
Figure 5A:
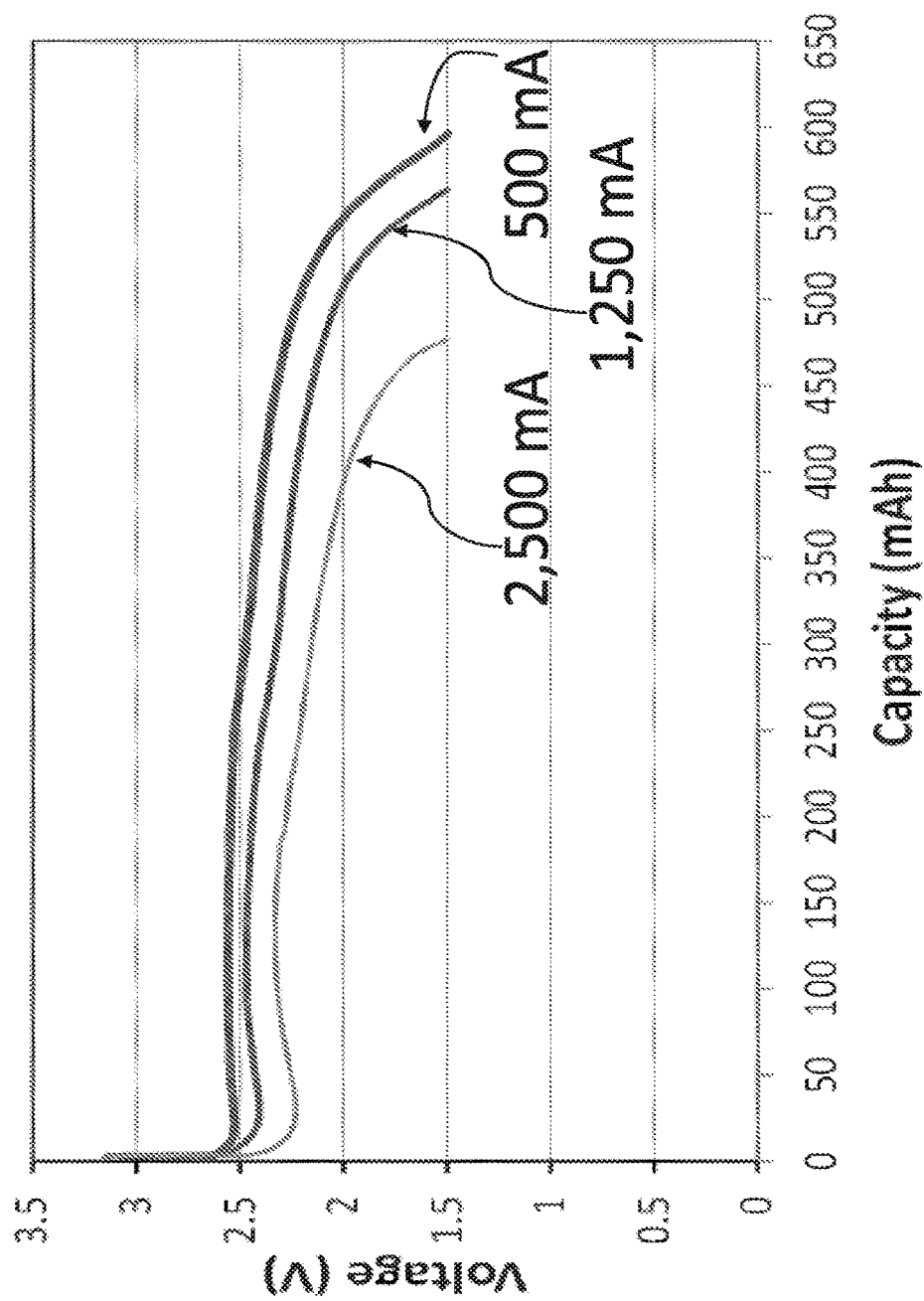
Figure 5B:
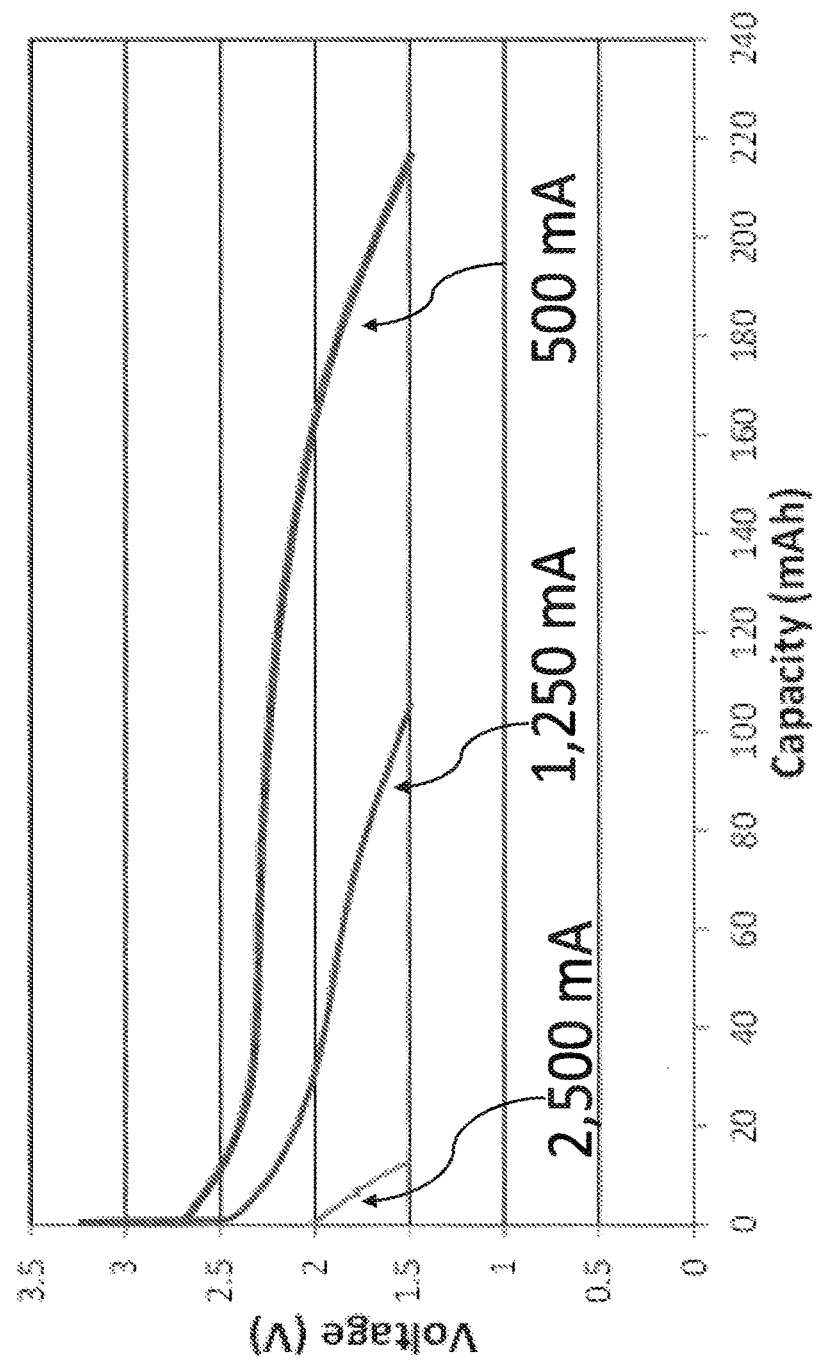
Figure 6:
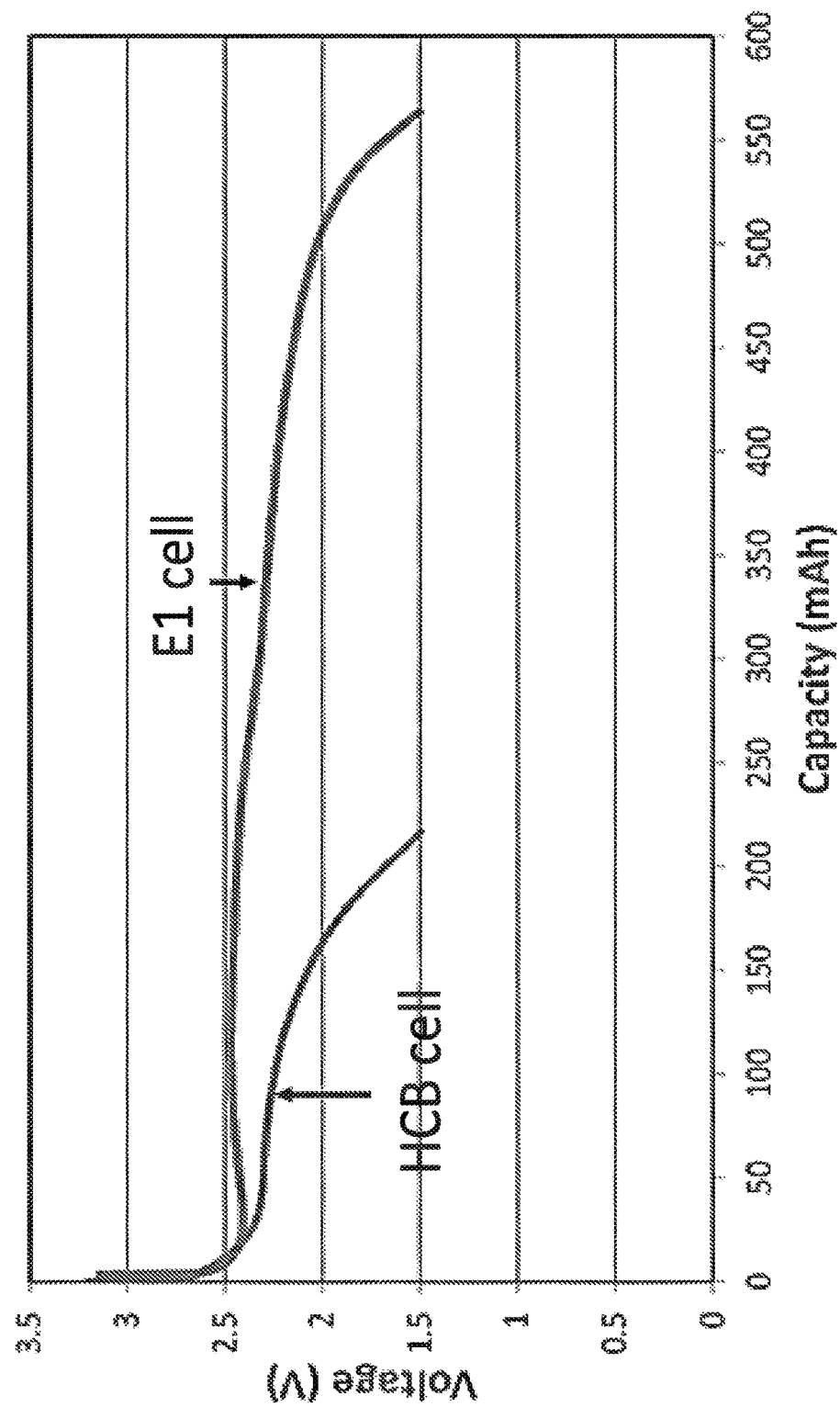
Figure 7A:
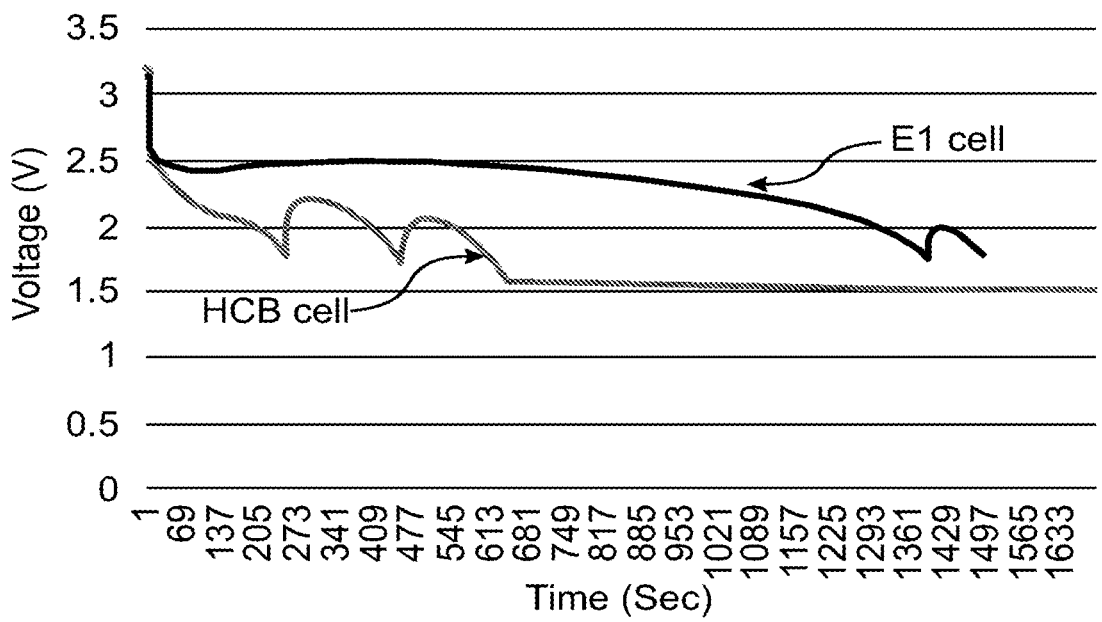
Figure 7B:
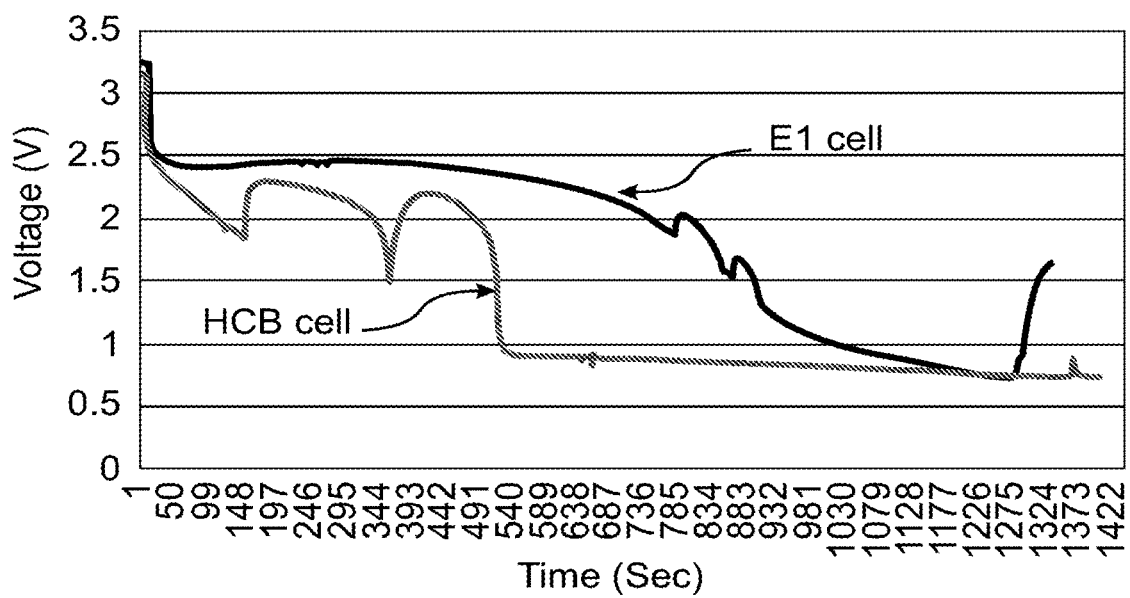
Figure 8:
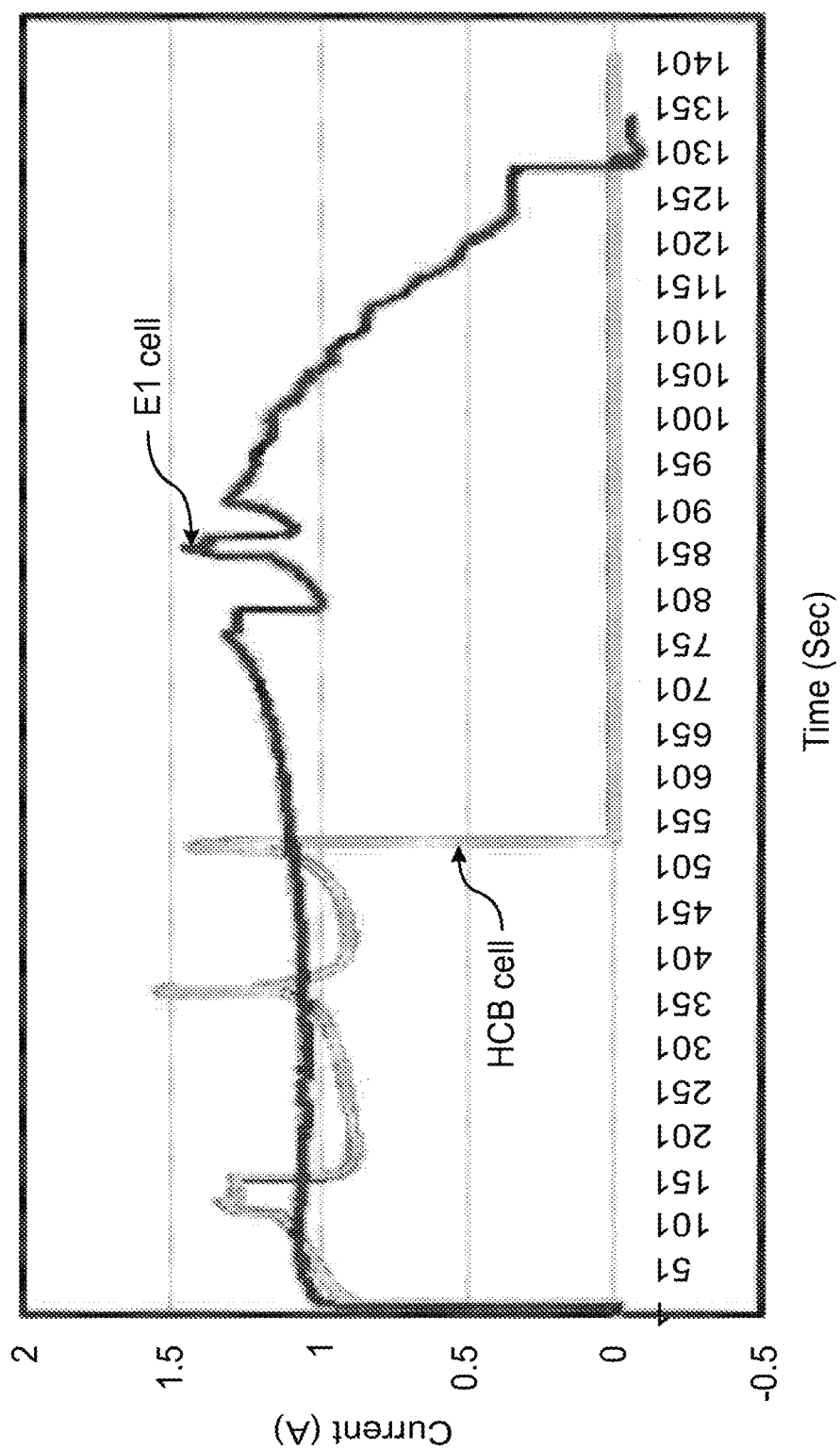
Figure 9:
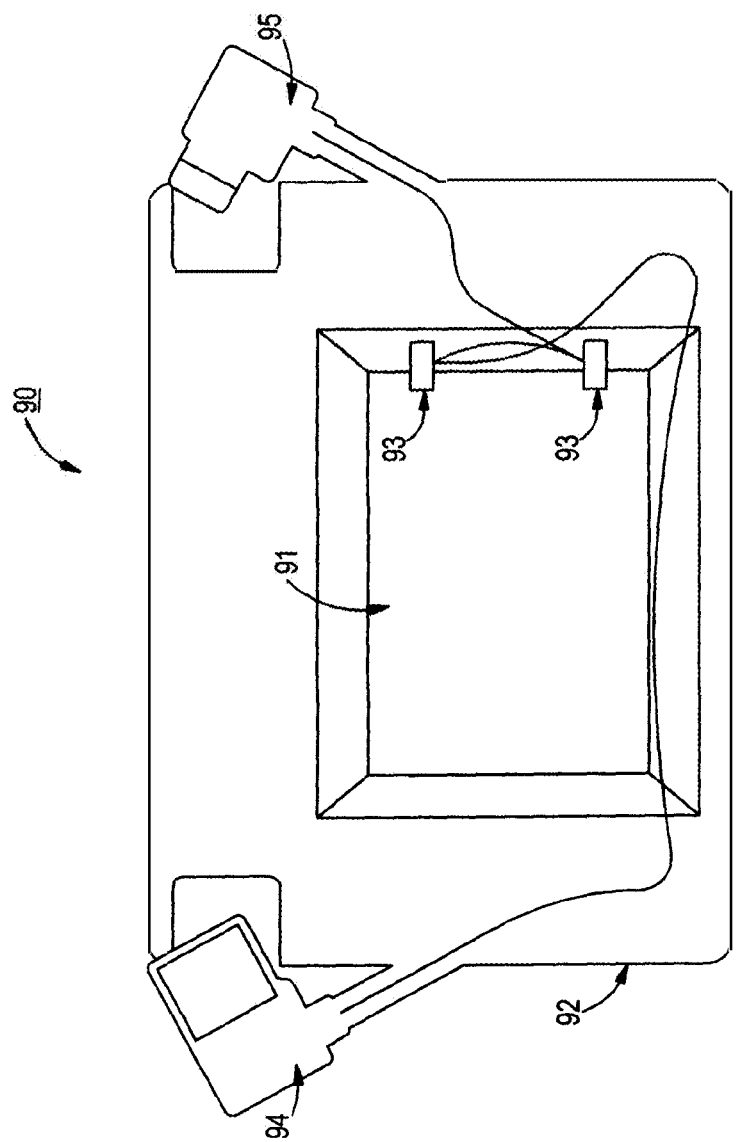

FIG. 2B presents several angles of view of an exemplary cell, as presented in FIG. 2A, showing for simplicity and clarity only the anode and the cathode without the separators;

FIG. 3 presents a comparative plot of energy as a function of power, as measured for a commercial HCB cell and for E1 exemplary cell, according to some embodiments of the present invention, as three power setting, 1 W, 3 W and 5 W, measured at room temperature;

FIGS. 4A-C present comparative plots of cell voltage and envelope temperatures measured for a commercial HCB cell and for E1 exemplary cell, according to some embodiments of the present invention, at a constant 1 W (FIG. 4A), 3 W (FIG. 4B) and 5 W (FIG. 4C);

FIGS. 5A-B present cell voltage (V) vs. capacity (mAh) of an exemplary E1 cell, constructed according to some embodiments of the present invention (FIG. 5A) and standard commercial HCB cell (FIG. 5B) measured at constant currents of 500, 1250 and 2500 mA, wherein the cells' nominal capacity is 775±25 mAh at 1 mA drain down to a 2 V cutoff potential;

FIG. 6 presents a comparative plot of discharge profile voltage (V) vs. capacity (mAh) of E1 cell, constructed according to embodiments of the present invention, compared to a standard HCB cell, wherein the two cells are being discharged at the same current density of 12 mA/cm$^2$, showing that the E1 cell is discharged at 1250 mA and the HCB cell discharged at 500 mA;

FIGS. 7A-B present comparative voltage vs. time plots of measurements recorded during a continuous 1.3 A discharge of an E1 cell and an HCB cell while charging an iPhone S4 (FIG. 7A) and a Galaxy S4 (FIG. 7B) smartphones;

FIG. 8 presents comparative current vs. time plots of measurements recorded while charging a Galaxy S4 smartphone using an E1 cell and an HCB cell, wherein the discharge was conducted at a constant power of 2.4 W applied until the cell either a current higher than 1.3 A or a cut-off voltage of 2 V; and FIG. 9 presents a schematic illustration of exemplary credit-card shaped electric power storage device, comprising an electrochemical cell constructed according to some embodiments of the present invention, disposed within a plastic case and fitted with two types of cellphone charging connectors.

DESCRIPTION OF SOME SPECIFIC EMBODIMENTS OF THE INVENTION

The present invention, in some embodiments thereof, relates to electrochemical cells, and more particularly, but not exclusively, to electrochemical cells and batteries with high discharge efficiency at high discharge rate and power, and methods of preparing the same.

The principles and operation of the present invention may be better understood with reference to the description of some embodiments thereof, and the accompanying figures and examples.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways. The current needs in the field of electronics and consumer products call for a high capacity electrical power source that can deliver its content efficiently and cost-effectively at a relatively short period of time without considerable loss of energy. Primary cells present an optimal solution to the problem of portable recharging devices for many reasons, including power density, cost and shelf life.

As presented hereinabove, batteries manufacturers continually try to develop batteries that will provide higher power without unacceptable sacrifices in other battery performance characteristics, such as long discharge life (high capacity), long storage life, resistance to leakage, and ease and cost of manufacture. Achieving high battery capacity is especially challenging on high rate and high-power discharge. Batteries are able to deliver only a fraction of their theoretical capacity (the maximum capacity that would result if the discharge reactions of the active materials in the battery were 100 percent efficient), and that fraction (discharge efficiency) decreases as the discharge rate and power increases.

Indeed, the main drawback of currently known primary cells for use in high energy charging applications stem, inter alia, from inefficient discharge capacity (low discharge efficiency), especially when the cell is required to deliver most of its stored energy at a high-drain rate. This limitation stems from the intrinsic properties of the electrochemical cell elements, namely, most primary cells suffer from sharply reduced power output at high discharge rates due to chemical and mechanical limitations that are manifested by increasing internal resistance.

It is noted herein that primary cells differ from secondary cells in many ways, including the solution to the problem efficient discharge at high-drain conditions. The challenge therefore lies in maintaining the high specific energy at high loading conditions in primary electrochemical cells.

Hence, one of the objectives of the present invention is to solve problems associated with primary cells in batteries, which are advantageous in most categories except for efficient delivery of the stored power at high drain rates (discharge efficiency), which is associated with increased internal resistance at high drain rate conditions. Another objective of the present invention is to provide an electrochemical battery cell, particularly a primary Li/$MnO_2$ battery cell, with efficient high rate and high-power discharge characteristics as well as excellent capacity on moderate and low rate and power discharge. Another objective of the present invention is to provide a primary Li/$MnO_2$ electrochemical battery cell that is inexpensive and easy to manufacture, has high capacity, performs well under expected temperature and operating conditions, has long storage life, is safe, and is not prone to failure as a result of misuse or abuse by the user. It is also an objective of the present invention to provide an economical battery cell with electrodes having a high interfacial surface area and high active material density in the electrodes that can be commercialized with a minimum of capital expenditure.

While seeking to improve the discharge rate of Li/$MnO_2$ batteries, the present inventors have contemplated a primary lithium metal cell configuration having specific structural characteristics and thermal dynamics that will reduce internal resistance and increase discharge efficiency so as to allow high-rate discharge, and at the same time have small dimensions so as to allow the cell to be thin enough to fit into a pocket or a credit-card slot in a wallet or purse.

It is known that one of the most critical limitation of high-rate discharge in lithium metal primary batteries is their internal resistance (impedance), which grows with the rate of discharge. Hence, while conceiving the present invention, the present inventors have contemplated a thin battery with sufficiently low internal resistance to be useful in fast recharge application as a portable emergency power source for consumer electronics such as smartphones.

While reducing the present invention to practice, it was surprisingly found that despite the expectation for an insurmountable limitation in discharge efficiency, which is known from a Ragone chart drawn to lithium metal cells, increasing interfacial surface area within a certain ratio of volume to active area of the cathode did improve the discharge efficiency to an unexpected high level. As presented hereinabove, this finding was unexpected since a large active area, while expected to increase the power of the cell per active material mass unit, was also expected to come at the expense of the energy transfer efficiency, meaning that less of the stored energy was expected to transfer from the cell to the target. As demonstrated in the Examples section that follows, this expectation was proven wrong, as can be seen by the performance of lithium metal cells produced according to embodiments of the present invention.

While thinning the electrode is beneficial in terms of overall impedance, it is demonstrated below that the 1.5-fold increase in the geometric active area of the electrodes is leading to a corresponding 2.5-fold reduction in the cell impedance; this in-turn can explain the superior performances of a cell constructed according to embodiments of the present invention, especially at ultra-high currents and current densities.

Definitions

Unless otherwise specified, the following definitions are used herein:

In the context of embodiments of the present invention, the term "electrode"
refers to a composite element comprising an active material, a current collector, a binder composition that keeps the active material attached to the current collector, and optionally additional materials that assist in the function of the electrode and the electrochemical reaction, such as activated carbon particles and other optional additives as known in the art. An electrode in the context of the present invention is used in an electrochemical cell such as in an energy storage device, as this term is known in the art. Hence, the term "electrode" as used herein encompasses all elements of the electrode, including the active material, the current collector, binding materials and any other element or material that is needed or optional for the function of the electrode. Unless stated otherwise, any reference to a property of an electrode made herein, such as volume, thickness, active area and the likes, accounts for all the elements of the electrode.

The current collector is an electron-conducting object/material responsible for transferring electron to and/or from the electrode, as known in the art. In some embodiments of the present invention, the current collector is used as the structural backbone or skeleton of the electrode, on the surface of which the active material is disposed. In some embodiments, the current collector is coextensive with the active material. In some embodiments the surface of the current collector is narrower than the surface of the active material. In some embodiments the current collector is a strip, a net, a mesh or a combination thereof. It is noted that in cases where the active material is a good electron conductor, the current collector can be narrower than the active material (the electrode).

The active material of an electrode is the material that undergoes redox reaction during discharge of the cell. The type of active material defines the polarity of the electrode (whether the electrode is an anode or a cathode). In some embodiments, the type, material and shape of the current collector depends of the active material of the electrode. The active material can be a standalone material to which a current collector is attached, as in some embodiments where the active material is lithium metal. The active material can be applied on one or more surfaces of a current collector that serves as a support for the active material, as in some embodiments where the active material is $MnO_2$. The active material can be porous or non-porous. A porous active material has the advantage of having a larger surface area due to the microstructure thereof. The active material can be made of particles being held together with a binder. The active material may optionally contain additives for improving electric conductivity, as well as other materials for improving electrode performance and stability, as these additives are known in the art.

The term "mass equivalent", as used herein, refers to the amount of an active material that will supply or react with one mole of electrons (e⁻) in a redox reaction, and is also known as a stoichiometric equivalent, an equivalent weight, or a gram equivalent.

As used herein and in the art in the context of electrochemical cells, the term "theoretical capacity" refers to the amount of electric charge a cell can store and theoretically deliver. The more electrode active material contained in the cell the greater its capacity, hence a small cell has less capacity than a larger cell with the same electrode active material (same chemistry), and the same open-circuit voltage.

Capacity measurements are expressed in ampere per hour (Ah) units. The rated (advertised; stated; nominal) capacity of a cell is typically provided as the product of 20 hours multiplied by the current that a fresh cell can consistently supply for 20 hours at 20° C., while remaining above a specified terminal voltage. As used herein in the context of embodiments of the present invention, the term "nominal capacity" refers to the energy/charge actually delivered by a fresh (fully charged) cell at about room temperature (20-25° C. or about 23° C.) and at a discharge current (discharge rate; load; current density) of about 1 mA, until a cutoff voltage of about ⅔ (two thirds) of the original voltage is reached.

The term "actual capacity" or for short "capacity", refers to the fraction of the stored charge that a cell can actually deliver. The actual capacity depends on several factors, including cell chemistry, cell structure, the current rate (load) at which the charge is delivered, the required terminal voltage, and the ambient temperature. The higher the discharge rate, the lower the actual capacity.

The term "active area", as used in the context of embodiments of the present invention, is a structural property of an electrode, which refers to the area that is available/capable of contacting and interacting with a counter electrode in an electrochemical cell. The active area is the interface through which the electrode interacts with a counter electrode in the cell, or, alternatively, the active area is the interfacial surface area that is capable of contacting an electrolyte or a separator for interacting with a counter electrode. In the context of embodiments of the present invention, an active area of an electrode is governed also by the spatial configuration (fold) thereof. For example, the active area of a rectangular thin strip-shaped electrode, which is covered completely on both sides with a counter electrode, is essentially the twice the length by width of the electrode; hence rectangular thin strip-shaped electrode having length of 10 cm and width of 4 cm, will have an active area of 80 cm² if the counter electrode is disposed on both sides of the strip.

The term "geometric surface area" or GSA, as used in the context of embodiments of the present invention, is a macroscopic structural property of an object that refers to the object as a monolithic, uniform, solid and smooth object, while ignoring microscopic structural features (microstructure) thereof. For example, a geometric surface area of Object A made from a porous material, is identical to the GSA of Object B differing from Object A only by being made of a non-porous material. A macroscopic feature is larger than a microscopic feature by at least three orders of magnitude (×10³). In addition, the GSA of an object disregards channels and interconnected or discrete internal cavities, voids or pores, and regards only at the open frontal surfaces of the object. The geometric surface area of an object made from a porous spongy material (e.g., foam) is typically smaller than the actual surface area of the object. The geometric surface area of an object made from a solid, continuous, non-porous material is essentially identical to the actual surface area of the object.

Similar to the GSA, the term "geometric volume" refers to the macroscopic volume of an object, ignoring microstructural features on its surface and/or in its bulk. For example, a geometric volume of an object is the space enclosed by its geometric surface area. The geometric volume of an object made from a porous spongy material is typically larger than the actual volume of the object. The geometric volume of an object made from a solid, continuous, non-porous material is essentially identical to the actual volume of the object. The geometric volume corresponds to the theoretical and nominal capacity of an electrode, as the volume represents the amount of active material available for the electrochemical reaction of the cell.

The term "geometric active area", as used in the context of embodiments of the present invention, is a structural property of an electrode that refers to the geometric surface area part of the total active area of the electrode. For example, if an electrode is made of a porous material or a material that has microscopic surface features, the geometric active area considers only the smooth geometric open frontal surface area portion(s) of the total active area of the electrode. In the context of the present invention, if an electrode is an essentially flat (a substantially two-dimensional) object, which is folded, rolled, ruffled, pleated, wrinkled, creased or crumpled into a three-dimensional object, the geometric active area of the electrode refers to the geometric active area of the flattened electrode.

Unless otherwise stated, a reference to an active area of an electrode made herein refers to its geometric active area. Unless otherwise stated, a reference to a volume of an electrode made herein refers to the geometric volume thereof.

The term "IR drop", also known as "ohmic potential drop" or "dip", as used herein, refers to a voltage drop that appears at the resistive component of any impedance. IR drop is the electrical potential difference between the two ends of a conducting phase during a current flow. IR drop is a potential drop due to solution/electrolyte resistance; thus, it is the difference in potential required to move ions through the solution/electrolyte, resulting from the electric current flow in ionic media. IR drop depends on the following factors: the current and potential distribution in the electrolyte; the size or shape of the electrodes; the relative position of the electrodes; and the conductivity of the electrolyte. In general, IR drop across the internal resistance of the cell decreases the terminal voltage of the cell during discharge thus reduces its discharge efficiency. Higher discharge rates give rise to higher internal voltage (IR) drops which explains the lower voltage discharge curves at high C rates in presently known cells.

The term "C-rate" refers to a measure of the rate at which a battery is discharged relative to its maximum capacity. A 1 C rate means that the discharge current will discharge the entire battery in 1 hour, and a 2 C rate means that the discharge current will discharge the entire battery in 0.5 hours. For a battery with a capacity of 10 Amp-hour, 2 C rate equates to a discharge current of 20 Amps.

The term "cut-off voltage" refers to the voltage at which a cell/battery is considered fully discharged, beyond which further discharge could result in malfunction at the powdered device and/or cause harm to the cell/battery if rechargeable. In the context of embodiments of the present invention, the cut-off voltage in a primary cell is ⅔ (two thirds) of the initial voltage of a fully charged cell.

The expression "discharge efficiency", as used herein, refers to ability of a battery to deliver its stored energy (capacity) to the target up to a certain cut-off voltage at a certain drain rate (load) and temperature. At low currents (load of 10 mA or less) at room temperature (RT), a primary cell delivers almost all its stored energy up to a certain cut-off voltage over a relatively long period of time, thereby nearing the theoretical maximum in discharge efficiency at a given temperature. Internal energy losses and limitations on the rate that ions pass through the electrolyte cause cell's discharge efficiency to vary. Above a minimum threshold, discharging at a low rate delivers more of the cell's capacity than at a higher rate. High-drain loads such as cellular devices and digital cameras can reduce total capacity of primary cells. For example, a battery rated at 2 Ah for a 10- or 20-hour discharge would not sustain a current of 1 A for a full two hours as its rated nominal capacity implies. Discharge efficiency can thus be estimated by the ratio of actual energy delivery versus theoretical or nominal energy delivery, expressed in percent. For example, when a cell delivers an actual capacity of AC mAh at a discharge rate (load) of 1,250 mA at RT, and the nominal capacity, based on the amount of fully charged active materials on the electrodes, is NC, then the discharge efficiency in percent is calculated by 100*(AC/NC). The choice of discharge rate of 1,250 mA is arbitrary, however, in the context of some embodiments of the present invention, this discharge rate is ideal for comparing cell performance when the cell is intended for high discharge rate applications.

An Electrochemical Cell for High Current Discharge:

According to an aspect of embodiments of the present invention, there is provided an electrochemical cell, which is characterized by an exceptional ability to deliver high percent of its stored energy at high current rates. In other words, the cell provided herein has a high discharge efficiency that can be verified and determined by a relatively simple method using readily available tools, based on obtaining or measuring the cells nominal capacity at room temperature and a current of 1 mA up to a cut-off voltage of ⅔ of an original voltage, as defined hereinabove, and comparing the nominal capacity to the cell's capacity at high currents, such as, for example, discharge at 1,250 mA at room temperature up to a cut-off voltage of ⅔ of an original voltage. Such high discharge efficiency is highly suitable for high-drain applications, such as fast charging a cellular phone.

In some embodiments, the cell is characterized by a discharge efficiency at room temperature of at least 20% at a discharge current (load) of 1,250 mA, based on a nominal discharge capacity at a load of 1 mA. In some embodiments the discharge efficiency at a load of 1,250 mA at RT is at least 30%, at least 40%, at least 50%, or at least 60%. Alternatively, the discharge efficiency at RT is at least 10% at a load of 2,500 mA, based on a discharge capacity at a load of 5 mA, or at least 20%, at least 30%, at least 40%, or at least 50% at a load of 2,500 mA at RT.

Active Material Distribution:

According to some embodiments of the present invention, the cell design is based on a cathode strip, an anode strip, and at least two separator strips, all of which are longitudinally stacked to form an electrodes set. The stacking arrangement of the electrodes set is such that when the electrodes set is folded into segments, at least one of the separator strips is disposed at least between the active area defined by the contact regions between the cathode and the anode. It is noted that the term "cathode strip" and "anode strip" refers to a strip-shaped electrode, including a current collector and any other element essential for the functioning of an electrode, as discussed hereinabove.

As discussed hereinabove, cell discharge is limited by internal impedance that depends, inter alia, on the shape and size of the active area on the cell. It is assumed that the exceptional discharge capacity of the cell presented herein is partly due to a unique active material distribution that can be defined by the ratio of the nominal capacity to the active area of the cell, as these terms are defined hereinabove. Briefly, the nominal capacity of a cell is used herein to relate to the amount of active material used in the cell, and the active area is used to define how it is distributed therein. Thus, according to embodiments of the present invention, high discharge efficiency is obtained when the ratio of nominal capacity to active area is kept below 12 $mAh/cm^2$. Alternatively, the ratio of nominal capacity to active area is lower than 11 $mAh/cm^2$, lower than 10 $mAh/cm^2$, lower than 9 $mAh/cm^2$, lower than 8 $mAh/cm^2$, lower than 7 $mAh/cm^2$, lower than 6 $mAh/cm^2$, lower than 5 $mAh/cm^2$, or lower than 4 $mAh/cm^2$.

The distribution of the active material can also be defined by the ratio of electrode volume to active area, assuming that each electrode comprises a mass equivalent with respect to the other electrode, or basing the ratio on the electrode with the smaller amount of active material corresponding to the mass equivalent. According to some embodiments, the ratio is preferably kept below 195.5E-6 (0.0001955) cm or any arbitrary length unit. Optionally, the volume to active area is lower than 190E-6 cm, lower than 170E-6 cm, lower than 150E-6 cm, lower than 130E-6 cm, lower than 100E-6 cm, lower than 80E-6 cm, lower than 60E-6 cm, lower than 40E-6 cm, lower than 30E-6 cm, lower than 20E-6 cm, lower than 10E-6 cm, lower than 8E-6 cm, lower than 6E-6 cm, or lower than 4E-6 cm.

In some cell chemistries, the cathode is the electrode that determines the discharge rate limitation, hence, in some embodiments of the present invention the, the cathode is the electrode in the electrodes set that is required to exhibit the abovementioned active material distribution. In some embodiments of the present invention the, the anode is the electrode in the electrodes set that is required to exhibit the abovementioned active material distribution. In some embodiments of the present invention the, both the cathode and the anode are required to exhibit the abovementioned active material distribution. In some embodiments of the present invention the, the cathode is required to exhibit the abovementioned active material distribution to some extent, and the anode is required to exhibit the abovementioned active material distribution to a different extent relative to the cathode.

Theoretically, the cathode and the anode should each exhibit a mass equivalent of the corresponding active material relative to the other, however, in some embodiments the cathode and the anode do not contain a mass equivalent. Amount and active material distribution requirements may be different between the anode and the cathode. The difference in active material distribution requirements between the anode and the cathode may stem from cost, safety, efficiency and other practical considerations.

Considering the anode as providing the fuel for the electrochemical cell, it is sometimes beneficial to have the fuel (anode active material) in excess relative to the cathode active material. In some cases, the anode material presents a hazard, either by it being too reactive, or for environmental reasons, and in these cases it is beneficial that the cathode active material will be in excess relative to the anode, thereby ensuring the anode is fully consumed when the cell is fully discharged. According to some embodiments, the ratio mass equivalent of the anode active material to the cathode active material is 1 (equal molar amounts of reactive the species). In some embodiments, the molar amount of the anode active material is 10% less than that of the cathode, namely the ratio mass equivalent of the anode active material to the cathode active material is 0.9. In some embodiments, the ratio mass equivalent of the anode to the cathode is more than 1, up to a factor of 2. In some embodiments, the ratio mass equivalent of the anode to the cathode ranges from 1.5 to 0.9.

The thickness of the electrodes in the cell, according to some embodiments of the present invention, and particularly the cathode in embodiments in which the cathode's active material is causing the discharge rate limitations, is less than 400 micron. Alternatively, the thickness of the electrodes is, independently, less than 300 micron, less than 200 micron, or less than 100 microns, or less than 50 micron. In some embodiments the anode is thinner than the cathode while maintaining a mass equivalent ratio of 1.5 to 0.9 with respect to the cathode.

The width of the electrodes set, according to some embodiments, ranges from 60 mm to 20 mm, or ranges from 45 mm to 35 mm. The width, thickness and length of the strips in the electrodes set determines the nominal capacity of the cell, hence the length is determined based on the cell's capacity and form factor requirements. The thickness of the electrodes set together with the cell folding configuration is believed to be responsible for the high discharge efficiency of the cell presented herein.

In some embodiments, the nominal capacity of the cell presented herein, while
depending on the particular cell chemistry and electrodes' size (volume of active material), ranges from about 500 mAh to about 2,000 mAh, however, cells with smaller or larger nominal capacity are contemplated within embodiments of the present invention. In some embodiments, the nominal capacity of the cell ranges from 700 mAh to 850 mAh, or about 775±25 mAh.

Cell Configuration and Thermal Consideration:

While thinning the electrodes, and thereby enlarging the active area of a cell, is expected to reduce impedance, it is also known that this reduction is bound and limited as other factors become more dominant at high currents, as made clear from Ragone chart analysis for any given cell. Thus, while reducing the present invention to practice, it was reckoned that the efficient cell discharge is likely to benefit from certain thermal conditions that may be afforded by a specific cell configuration, and more particularly, by the number of segments in which the electrodes set is arranged, whereas the electrodes set comprises an elongated sheet-shaped cathode, an elongated sheet-shaped anode and at least two elongated sheet-shaped separators. For clarity, the term "elongated sheet-shaped" is essentially equivalent to the terms "ribbon-shaped" or "strip-shaped", meaning that the electrodes and the separators are each a long narrow piece of a composite material. For the sake of brevity, an elongated sheet-shaped element is referred to herein as a strip; hence, for example, an elongated sheet-shaped anode is referred to as an anode strip.

In the context of embodiments of the present invention, the expression "electrodes set" refers to a substantially coextensively and substantially overlappingly stack that comprises a cathode strip, an anode strip and two separator strips, one separator strip interposed between the anode and the cathode, and another separator strip on the other side of either the cathode or the anode strip. In some embodiments, the anode and the cathode strips have essentially the same width, and the separator strips are wider than the anode/cathode strip so as to assure no direct contact can occur therebetween.

The electrodes set can be folded into segments, wherein each strip is folded together with the other strips of the electrodes set. According to some embodiments, the electrodes set is folded into substantially rectangular segments, as illustrated in FIG. 1A. It is noted that the illustrations presented in FIG. 1A are not to be regarded as limiting with respect to the number of segments or the stacking and folding order of the electrodes set, namely electrodes set can be folded into 4 segments or more; and/or the cathode and the anode strips can be switched therebetween; and/or the separators can be interposed otherwise, as long as there is at least one separator strip between the anode and the cathode strips. The segments can be substantially square, or have any other rectangular dimensions, essentially based on the intended use of the cell. In some embodiments, the cell is folded into a substantially rectangular shape having dimensions of about 40 mm by about 40 mm, however, the cell can have other sizes and shapes, which are all contemplated as embodiments within the scope of the present invention.

In general, the cell is folded to have a substantially rectangular and thin form factor, wherein the thickness of the folded cell depends on the thickness of the electrodes set and the number of segments it is folded to. In some embodiments, the thickness of the folded cell ranges from 1 mm to 4 mm.

FIG. 1A presents a schematic illustration of three optional stacking and segment
arrangement in electrodes set alternatives, according to some embodiments of the present invention, wherein the numbers represent segment count by which the electrodes set is folded.

In some embodiments, all the strips overlap along the narrow axis thereof (overlap laterally) as well as on the long axis thereof (overlap longitudinally); this type of electrodes set is referred to as "type I electrodes set", or for short "type I" (top illustration in FIG. 1A). In some embodiments, one of the anode or cathode strips extends longitudinally beyond the other by one segment, while the two separator strips overlap longitudinally and laterally with one of the anode or the cathode strips; this type of electrodes set is referred to as "type II electrodes set", or for short "type II" (middle illustration in FIG. 1A). In some embodiments, one of the anode or cathode strips is longer than the other by one segment, while the two separator strips overlap longitudinally and laterally with one of the anode or the cathode strips; this type of electrodes set is referred to as "type III electrodes set", or for short "type III" (bottom illustration in FIG. 1A). Unless stated otherwise, a segment having only one of the anode or the cathode therein, as can occur in type II and type III electrodes sets, is counted as one segment. It is also noted that the separators can be longer than any one of the electrodes by any fraction of a segment, or by one or more segments.

As for thermal considerations, cell performance can change dramatically with temperature, particularly in cells based on ion transport in the electrolyte. At the lower extreme, in batteries with aqueous electrolytes, the electrolyte itself may freeze setting a lower limit on the operating temperature. At low temperatures lithium batteries suffer from lithium plating of the anode causing a permanent reduction in effective capacity. At the upper extreme the active chemicals may break down destroying the battery. In between these limits the cell performance generally improves with temperature. Without being bound by any particular theory, it is assumed that multiple over-fold windings of the electrodes, or multiple zigzag folds of the electrodes, or any other form of multiple layering of the electrodes into a compact configuration, contributes to the preservation of the heat that is generated by the rapid discharge of the cell, thereby lowering its internal resistance, which in turn reduces the IR drop, leading to the notable improvement of the discharge efficiency.

Thus, according to some embodiments of the present invention, the cell
- comprises an electrodes set that is compacted by folding in a certain configuration in order to maintain certain thermal condition within the cell while it is being discharged. The electrodes set is also shaped and folded in order to fit particular spatial requirement depending on the particular use of the cell (fitting in predesigned cavities in electronic devices etc.); however, since the compactness of the cell presented herein serves to increase cell discharge efficiency, spatial considerations are secondary and typically do not negate the thermal requirement.

In some embodiments, the electrodes set is folded spirally in what is known as a prismatic cell configuration, which also satisfies a demand for a thinner form factor. A prismatic cell configuration makes optimal use of space by using the layered or spiral over-folded approach, which is a flattened pseudo-prismatic jellyroll. According to some embodiments of the present invention, the electrochemical cell is having a flattened pseudo-prismatic jellyroll configuration, or in short a flattened jellyroll configuration. In some embodiments, the flattened jellyroll is folded into at least 4 segments afforded by 3 folds. Alternatively, the flattened jellyroll is folded into at least 5 segments, at least 6 segments, at least 7 segments, at least 8 segments, at least 9 segments or at least 10 segments. Preferably, the electrodes set is folded into 4-7 segments, or into 5-8 segments, or into 4 segments, into 5 segments, into 6 segments, into 7 segments, or into 8 segments.

Figure 1B:
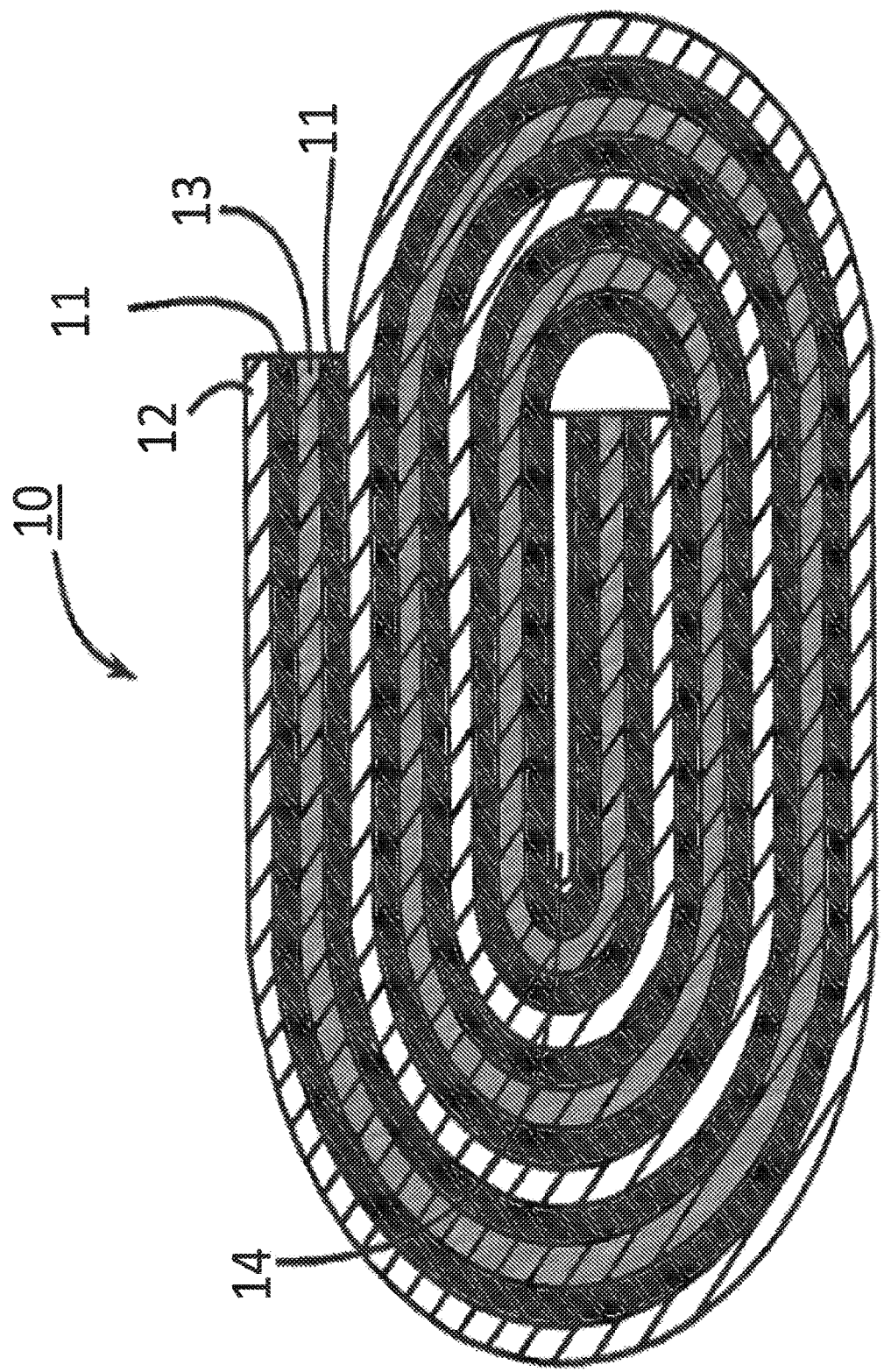
FIG. 1B is a schematic illustration of a cross-section view of an embodiment of a flattened pseudo-prismatic jellyroll cell configuration, demonstrating a 6 segments cell configuration.

FIG. 1B is a schematic illustration of a cross-section view of an embodiment of a flattened pseudo-prismatic jellyroll cell configuration, demonstrating a 6 segments cell configuration.

As can be seen in FIG. 1B, the cross-section view of flattened jellyroll cell configuration 10 is having four overlapping strips that are folded into 6-segments via 5 folds. Separators 11 account for two of the strips, anode 12 accounts for one strip, and cathode 13 accounts for the fourth strip. As can be seen in FIG. 1B, this configuration results in alternating segments of anode 12, cathode 13 and separators 11 when wound with or without the use of inert core 14. It is noted that the illustration presented in FIG. 1B is not limiting with regards to the stacking order of the electrodes, namely the cathode and the anode strips can be switched therebetween, as long as they are kept separated by at least one separator strip.

Alternatively, the cell can be compacted by multiple zigzag folds, as in
- accordion pleats, alternating the direction of the folds rather than spirally in one folding direction. In this zigzag fold cell configuration embodiment, the cell has at least 3 alternating folds forming an electrodes set with 4 segments. Alternatively, the zigzag is folded into at least 5 segments, at least 6 segments, at least 7 segments, at least 8 segments, at least 9 segments or at least 10 segments. Preferably, the zigzag folded electrodes set has 4-7 segments, or 5-8 segments, or into 4 segments, into 5 segments, into 6 segments, into 7 segments, or into 8 segments.

Embodiments of the present invention are meant to encompass other cell configurations, which are conducive to thermal conditions that afford high discharge efficiency of the cell.

In some embodiments, the cell is sealed in a container or pouch made from thermally (heat) insulating material, which assists in maintaining the relatively high temperature in the cell, stemming from the heat that is being generated during cell discharge at high current rates.

Lithium Metal Cells:

The presently known lithium metal electrochemical cells utilizes a lithium metal as the anode, and an electrolyte containing lithium salts in a mixed organic solvents. Such solvent typically includes propylene carbonate (PC) and 1,2-dimethoxyethane (DME), and a specially prepared heat-treated form of $MnO_2$ for the active cathode material. The cell reactions for these system is represented in Scheme 1 below.

Scheme 1

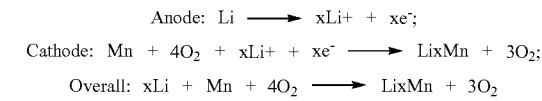

As can be seen in Scheme 1, manganese dioxide, an intercalation compound, is reduced from the tetravalent to the tetravalent state producing $LixMnO_2$ as the Li ions enter/intercalate into the $MnO_2$ crystal lattice.

$Li/MnO_2$ cells are also advantageous in terms of shelf life. The storage characteristics of $Li/MnO_2$ cells feature a high stability in all of the configurations, with a loss of capacity of less than 1% annually. The cells also have no voltage delay at the start of most discharges, (except for low temperatures upon high discharge rates). Hence, $Li/MnO_2$ batteries are manufactured in several different designs and configurations to meet the range of requirements for small, lightweight, portable power sources.

The following description of battery shapes and spatial cell configurations uses of $Li/MnO_2$ batteries as a form of example; however, the description of the various structural configurations of cells and batteries should be seen as referring more generally to batteries of other chemistries, and as relevant to some embodiments of the present invention, and particularly to electrochemical cells designed for high load discharge, as presented herein.

$Li/MnO_2$ batteries are commercially available in a number of flat and cylindrical shapes ranging in capacity from about 30 mAh to 1400 mAh. Larger-size batteries have been developed in cylindrical and rectangular configurations. Flexible thin pouch primary lithium batteries have emerging and established applications such as smart cards, RFID, and various internet of things (IOT) applications. Currently, primary $Li/MnO_2$ batteries have energy densities of between roughly 100 and 700 W-h/L, depending on the size of the battery (smaller batteries will have lower capacity due to the higher fraction of the battery taken up by inactive components such as the packaging). They also offer shelf life of up to five years, and can discharge up to C/2 (meaning continuously discharge the cell over two hours.)

In "Coin Cells", the manganese dioxide pellet faces the lithium anode disk being separated by a nonwoven polypropylene separator impregnated with the electrolyte. The cell is crimped-sealed, with the can serving as the positive terminal and the cap as the negative terminal.

The "Bobbin-Type Cylindrical Cell" is one of the two $Li/MnO_2$ cylindrical cell configurations. The Bobbin design maximizes the energy density due to the use of thick electrodes and the maximum amount of active materials, but at the expense of electrode surface area and hence provides limited current drains, limiting the rate capability of the cell and thus severely restricts its use only to low-drain applications. Bobbin cells contain a central lithium anode core surrounded by the manganese dioxide cathode, separated by a polypropylene separator impregnated with the electrolyte. Bobbin batteries having a 10-year life, are used for memory backup and other low-rate applications.

Spirally wound "jelly-roll" cells are designed for high-current pulse applications as well as a continuous high-rate operation. The lithium anode and the cathode, as a thin, pasted electrode on a supporting grid structure, are wound together while a microporous polypropylene separator is positioned in-between the two thin electrodes to form the jelly-roll construction. This design achieves a high electrode surface area, and thus the rate capability is increased. This technology is also adopted in Li-ion secondary battery manufacturing lines, wherein graphite pasted on a copper current collector replaces Li metal and lithiated metal oxides/olivines are used as Li ion source and cathode materials. The capacity of such cells can be as high as 4 Ah in 18650 cell dimension, enabling currents as high as 4-6 $mA/cm^2$.

The $Li/MnO_2$ cell chemistry has also been implemented in multi-cell 9V batteries. These batteries contain three prismatic cells, using an electrode design that utilizes the entire interior volume. An ultrasonically sealed plastic housing is used for the battery case.

Plastic-aluminum foil pouch cell designs, and other cell design concepts are
being used to reduce the weight and cost of batteries by using lightweight cell packaging composed of a laminate "sandwich type" polyethylene-Aluminum-polyethylene. Within this approach, the use of heat-sealable thin foil laminates, as described above, mimicking a prismatic cell configuration, allow the switch and replacement of the traditional metal containers. This technology is also adopted in Li-ion secondary battery manufacturing lines; wherein graphite pasted on a copper current collector replaces Li metal and lithiated metal oxides/olivines are used as Li ion source and cathode materials. The capacity of such cells can be as high as 10 Ah, enabling currents as high as 4-6 $mA/cm^2$.

As further discussed hereinabove, the nominal voltage of the $Li/MnO_2$ is about 3
V, and the operating voltage during discharge ranges from 3.1 to 2.0 V, depending on the cell design, state of charge, and other discharge conditions. The end or cutoff voltage, defined as the voltage by which most of the capacity has been expended, is 2.0 V, except under high-rate, low-temperature discharges, when a lower end voltage may be desired or specified.

The discharge characteristics of presently known cylindrical spirally wound batteries is yet to meet the most demanding high-drain rates of some applications, particularly applications of fast recharging of user electronics on the go. The presently known batteries are designed for operation at fairly high rates and low temperatures. Their discharge profile is flat under most of these discharge conditions. The good performance of the $Li/MnO_2$ battery at the lower-rate discharges is evident, and it still delivers a higher percentage of its capacity at relatively high discharge rates compared to conventional aqueous primary cells; however, the discharge efficiency of presently known lithium metal batteries is not sufficient for top rate applications.

The internal resistance of a $Li/MnO_2$ battery, as with most battery systems,
depends on the cell size, spatial design, electrode material and area, separator, as well as the chemistry of the redox reaction. Inherently, the conductivity of the organic solvent-based electrolytes is lower than that of an aqueous electrolytes, and the $Li/MnO_2$ system, therefore, has a higher impedance than conventional aqueous batteries having the same size and construction. As a rule-of-thumb, designs which increase electrode area and decrease electrode spacing, such as coin-shaped flat cells and spirally wound jelly-roll configurations, are used to reduce the resistance. Typically, the resistance is a mirror image of the voltage profile. In pouch cells, the two parameters remain fairly constant for most of the low-medium discharge currents (1-10 mA) and increases at the end of battery life. On the other hand, a discharge current at the high end of the current loading (200 mA) would yield a discharge curve with a steeper slope.

Cell Chemistry:

In some embodiments of the present invention, the cell is a primary cell. Alternatively, the chemistry of the cell allows it to be recharged, hence the cell can also be a secondary cell.

In embodiments where the cell is a primary cell, the anode active material is lithium, as this metal possess attributes which are particularly suitable for high discharge rate cells, as well as other more general advantages, such as half-cell potential, and stability in long-term storage conditions. Alternatively, the anode comprises aluminum, silicon, carbon, zinc, and alloys and combinations thereof as optional anode active materials.

In some embodiments, the cathode active material is $MnO_2$. Alternatively, the
cathode active material is selected from the group consisting of $FeS_2$, $CoO_2$, $NiMnCoO_2$, $FePO_4$, $NiCoAlO_2$, $Ti_5O_{12}$, and $CF_x$ (mono fluorinated carbon).

It is noted herein that the chemistry of the cell presented herein is not limited to the examples or embodiments presented herein, as other suitable combinations of anode and cathode active materials are also contemplated within the scope of the present invention.

Applications:

The cell presented herein can be used for any applications typical for any cell or battery. In addition, the cell presented herein can be particularly useful in applications that require high-rate capability, compared with the conventional primary batteries.

A battery comprising cells as presented herein can be used, without limitation, in solid and magnetic memory applications, watches, calculators, cameras, and radio frequency identification (RFID) tags. At the higher drain rates, the cells presented herein is particularly useful in motor drives, automatic cameras, toys, personal digital assistants (PDAs), digital cameras, cellular phones and utility meters.

Of particular utility, the cell presented herein can be used to recharge a secondary battery at a high discharge rate, thereby allowing the user of a device powered by the secondary battery to regain usability of the device at a notably short time period, compared to AC/DC chargers and other secondary cell power sources. Due to its shape configuration, the cell presented herein can be shaped into small, flat, "credit-card" dimensions, making it an ideal pocket/wallet emergency power source for users away from a power outlet in need thereof.

According to an aspect of some embodiments of the present invention, there is provided an electric power storage device, which includes at least one electrochemical cell as presented herein. The electric power storage device can comprise a single cell or a multiple cells (battery).

In some embodiments, the electric power storage device further includes at least two contact terminals, which lead electricity from the cell for any power consumption usage, wherein the contacts are in direct conductive communication with each of the anode and cathode, and more specifically with the current collectors of each of the electrodes.

The device, according to some embodiments, further includes an electric connector, or utility plug, which is connected to the contact terminals. The cell presented herein can be part of a storage device having one or more connectors, wherein each can be used for a different application and can be shaped according to the power inlet of the power consuming device. For example, the cell presented herein can form a part of a cellphone charging device, and thus have a mini-USB connector attached thereto. Such cellphone charging device should have the capability to discharge at a relatively high current, such 1,000 mAh or more.

Exemplary Embodiment

The present invention has been demonstrated by an exemplary cell, as presented in the Examples section that follows below. The process of manufacturing the exemplary cell is demonstrated with Li/MnO$_2$ chemistry, wherein the anode strip is produced from a 130 micron thick lithium foil, and the cathode is produced as a 200 micron thick strip made of MnO$_2$ aggregates mixed with activated carbon particles and held together by a binder and affixed on a thin aluminum mesh serving as a current collector and support for the cathode's active material.

Since the width of the cathode strip and anode strip is essentially the same, and the strips have a given thickness, the length of the strips determines the final amount of active material and the ratio therebetween, and determines the final active area of the cell. In the following process example, the 110 mm by 40 mm MnO$_2$ cathode is sandwiched between two standard separators suitable for Li/MnO$_2$ cells, and the 148 mm by 40 mm anode is stacked on top of the cathode. The excess part of the anode, being longer than the cathode, is folded into the first (inner) segment, and the second, third and fourth segments include the cathode and flanking separators, essentially as illustrated in FIGS. 2A-B.

In the electrode preparation step of the process, the current collectors of the folded electrodes set are fitted with contact terminals. In the following process steps, the resulting folded electrodes set is wrapped and sealed in a polymer-aluminum pouch, while letting all air out of the pouch before sealing, thereby providing both thermal and electric insulation to the cell while letting the contact terminals stick out of the sealed pouch without breaking the seal.

The pouch comprising the cell can be fitted with a mini-USB connector and placed in a plastic case having a form factor of a standard credit card, wherein the mini-USB connector and the short cable connecting the same to the cell is fitted in a groove at the side of the case, allowing the connector to be tacked away when the cell is not in use, and pulled out to connect to a cellular phone when in use.

FIG. 9 presents a schematic illustration of exemplary credit-card shaped electric power storage device 90, showing sealed-pouch cell 91, constructed according to some embodiments of the present invention, disposed within credit-card shaped plastic case 92, and further showing contact terminals 93 connected to each of micro-USB connector 94 and Lightning-USB connector 95. The device depicted in FIG. 9 should not be seen as limiting the shape, size, connecting means or intended use of the cell presented herein.

It is expected that during the life of a patent maturing from this application many relevant electrochemical cells will be developed and the scope of the term electrochemical cell is intended to include all such new technologies a priori.

As used herein the term "about" refers to up to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the terms "process" and "method" refer to manners, means, techniques and procedures for accomplishing a given task including, but not limited to, those manners, means, techniques and procedures either known to, or readily developed from known manners, means, techniques and procedures by practitioners of the chemical, material, mechanical, computational and digital arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non-limiting fashion.

Example 1

Primary $Li/MnO_2$ Cell

As a proof of concept of the present invention, a well-known commercially available cell was compared to a cell constructed according to some embodiments of the present invention, wherein the two cells have the same chemistry, the same form-factor and the same amount of active materials.
Commercial Cell:
For this experiment, the state-of-the-art $Li/MnO_2$ slim pouch cell, HCB-CP224147 (HCB for short) was selected. This commercially successful product is manufactured by Wuhan Fanso Technology Co., Ltd. Of China, one of the largest lithium metal battery manufacturer in the world.

Presently known $Li/MnO_2$ batteries, such as HCB, are limited in their high-rate
discharge capacity, as discussed hereinabove. The commercial battery specification indicates that 50% of the cell's advertised nominal capacity of 775±25 mAh is guaranteed at load discharging of 200 mA at room temperature.

Based on realistic assessments, the nominal capacity of the commercial cell, as used in the context of the present invention, is 775±25 mAh. The HCB cell comprises a manganese dioxide cathode having a length of about 73.3 mm, a width of about 40 mm and a thickness of about 400 microns (geometric volume of about 0.011728 $cm^3$; 1,172.8 $mm^3$), wrapped on both sides with a 200 μm thick lithium anode having a length of about 110 mm and a width of about 40 mm, giving the HCB cell an active area of about 60 $cm^2$, and a volume to active area of about 195.5E-6 cm.

While discharging a typical commercially available $Li/MnO_2$ pouch cell slim battery, such as the HCB, at the low-medium current densities of 1-10 mA, the average voltage was found to be stable during the first ⅔ of the discharge profile. Discharge at a low current density of 1 mA, the average potential of the cell in the first ⅔ of the discharge profile is about 2.9 V, namely the discharge profile had a slope of about 0.23 mV/mAh. At a medium current density of 10 mA, the potential during the first ⅔ of the discharge profile was about 2.7 V, having a slope of 0.285 mV/mAh. However, when a higher discharge rate (current density; load) of 200 mA is applied, the discharge profile had a steeper slope, with no observable voltage plateau, exhibiting an average potential of about 2.5 V. The slope of the discharge curve yielded a discharge rate of 1 m V/mAh, four times faster than the potential decay rate measured at the low to low-medium current densities.

The advertised capacity is 775±25 mAh at a load of 1 mA until a cutoff voltage of 2.0 V at 23° C., and the impedance is at about 530 mΩ. The average operating voltage of a typical commercially available $Li/MnO_2$ pouch cell slim battery, such as the HCB, once the temperature is increased from zero to 20° C., changes slightly, only by 50 mV, when discharging the cell at a low current density: from 2.85 V to 2.9 V (slightly less than 2%). When discharge is occurring at the 10 mA discharge rate, the potential climbs from 2.5 V to 2.62 V (120 mV, slightly less than 5%) upon an increase in the same temperature range. The effect of temperature rise is much more pronounced if a discharge current of 200 mA is applied: from 2.3 to 2.5 V (200 m V, slightly lower than 9%).

HCB comprises strip-shaped electrodes set folded into three segments in a flattened jellyroll configuration, wherein the first segment comprises lithium between two separators segment (separator/lithium/separator), and the second and third segments are separator/lithium/separator/$MnO_2$ segments. The lithium strip anode is conducting, hence it is attached to one copper contact, and the cathode active material, $MnO_2$, is applied on a metal mesh which is attached to the other copper contact. The folded electrodes set is encased in a plastic-laminated aluminum pouch having the two sealed copper contacts sticking out from each of the current collectors. The separator is a standard 25 μm thick porous polypropylene foil impregnated with a non-aqueous electrolyte comprising about 1 M lithium salts (e.g., $LiClO_4$) in propylene carbonate (PC) solvent.

The thickness of the sealed pouch is about 1.75±0.25 mm, having a rectangular 45±2 mm by 48±2 mm form factor, approximately.

Cell with Improved Discharge Efficiency:

The cell that was constructed according to some embodiments of the present invention was designed to have substantially the same form factor, the same encasement and terminal contact leads, the same type and amount of anode and cathode active materials, and the same separators and current collectors, making comparison of the state-of-the art HCB cell as simple and meaningful as possible to the presently provided cell, according to some embodiments of the present invention, referred to herein as Embodiment-1, or E1 for short.

FIG. 2A is a schematic diagram of Embodiment-1 (E1) cell, an exemplary electrochemical cell constructed according to some embodiments of the present invention, showing at the top part the stacking order of the unfolded electrodes set, and showing at the bottom part a cross-section side view the folded electrodes set having a flattened jellyroll configuration.

E1 differs from HCB in the design of the electrodes set, and unless stated otherwise, all other parameters and elements are essentially the same as in HCB. The lithium anode strip was made to a length of about 148 mm ($L_a$ in FIG. 2A), a width of about 40 mm (W in FIG. 2A) and a thickness 130 μm ($T_a$ in FIG. 2A), and was folded into four segments. The $MnO_2$ cathode strip was made to a length of about 110 mm ($L_c$ in FIG. 2A), a width of about 40 mm (W in FIG. 2A) and a thickness of about 200 μm ($T_c$ in FIG. 2A) including the aluminum mesh embedded therein (geometric volume of about 0.00088 $cm^3$; 880 $mm^3$), and folded together with two separator strips into three segments. The separators used in E1 were essentially the same as in HCB, having a width of about 40 mm (W in FIG. 2A) and a thickness of about 25 μm ($T_s$ in FIG. 2A). As can be seen in the bottom part of FIG. 2A, the electrodes set was folded in a flattened jellyroll into four segments, wherein the first segment comprises lithium, and the second, third and fourth segments are made of lithium/separator/$MnO_2$/separator. The active area of the E1 cell was about 90 $cm^2$, making the ratio of volume to active area about 9.8E-6 cm.

FIG. 2B presents several angles of view of an exemplary cell, as presented in FIG. 2A, showing for simplicity and clarity only the anode and the cathode without the separators.

The E1 cell design paradigm is aimed at achieving high power capabilities, while maintaining the same loading of the active cathode material and overall physical dimensions of the comparable commercially available cell, with the following differences:

1. Increase the geometric active area of the electrodes to 115 $cm^2$;
2. An additional segment of the electrodes set (additional wrapping);
3. Reduced impedance from 0.525±0.25 Ohms to 0.19±0.1 Ohms; and
4. The same mass of $MnO_2$ is now spread on 115 $cm^2$, yielding a cathode with a thickness of 200 microns, and 130 microns of Li metal anode, composed of 10 microns copper current collector and 60 microns of Li metal at each side.

The cells HCB and E1 were drained at a rate of 1 mA from fully charged state starting at 3 V down to a cut-off voltage of 2 V (⅔ of the initial voltage). Table 1 presents some parameters comparing HCB to E1.

TABLE 1

| Element | HCB-CP224147 | E1 |
| --- | --- | --- |
| Cathode thickness | 400 μm | 200 μm |
| Cathode length | 73.3 mm | 110 mm |
| Cathode width | 40 mm | 40 mm |
| Cathode geometric volume | 880 $mm^3$ | 1,172.8 $mm^3$ |
| Anode thickness | 200 μm | 130 μm |
| Separator thickness | 25 μm | 25 μm |
| Nominal capacity @1 mA | 775 ± 25 mAh | 775 ± 25 mAh |
| No. of segments | 3 | 4 |
| Active area (approx.) | 60 $cm^2$ | 90 $cm^2$ |
| Pouch thickness (approx.) | 1.75 mm | 1.75 mm |
| Impedance | 530 mΩ | 190 mΩ |
| Vol/Active area ratio | 195.5E-6 cm | 9.8E-6 cm |
| Capacity/Active area ratio | 12.5 mAh/$cm^2$ | 8.3 mAh/$cm^2$ |

As can be seen in Table 1, the design of the E1 cell successfully reduced the impedance of the cell to 35% of the impedance of the equivalent cell HCB-CP224147, by simply thinning and elongating the electrode strips. This result alone may serve as an indication to enhanced results and performances expected from the cell, but it is not sufficient to conclude and determine if the E1 cell will out-perform the state-of-the-art cell at high drain rates. For this to be established, the cells have to be compared at higher loads and temperatures, as done in the following experiments.

Example 2

Discharge Performance

The cell provided herein, such as the exemplary E1 cell, according to some embodiments of the present invention, is designed, inter alia, to provide cellphone users with an emergency power sully. During the use time of the cell, it is preferable that it will provide sufficient energy to power up a fully drained cellphone battery, thereby providing the user with a meaningful amount of additional talk time.

In order to compare cell performance, a comparison was made between the HCB-CP224147 commercial cell and E1, as presented hereinabove, namely two cells having the same chemistry, build, nominal capacity and physical dimensions. The comparative test objectives include measuring the total energy output generated on different constant power discharge regimes (different loads), and measuring cell envelope temperatures during different constant power discharge regimes.

Materials and Methods

Three sealed cells of each type, HCB-CP224147 and E1, were used for the experiment, wherein the commercial cells were purchased from a battery vendor and the E1 cells were prepared according to specifications.

Various electrical parameters were measured using a multifunction programmable DC electronic load tester, model E3711A by Array Electronic Co., Ltd. of Taiwan. Cells' outer surface temperature was measured using an optical thermometer, model NMD by Neoptix Canada LP.

The power vs. energy test included setting the electronic load to constant power discharge mode; discharging the cells at 1 W, 3 W and 5 W settings; and recording discharge current and voltage.

The cell temperature test included setting the electronic load to constant power discharge mode; discharging the cells at 1 W, 3 W and 5 W settings; and recording cell envelope temperature. The tested cells were connected directly to the electronic loader, and the data log was stored on a connected computer. The temperature probe was affixed at the center of the cell's broad encasement surface (side) using an adhesive tape.

Results and Analysis

FIG. 3 presents a comparative plot of energy as a function of power, as measured for a commercial HCB cell and for E1 exemplary cell, according to some embodiments of the present invention, as three power setting, 1 W, 3 W and 5 W, measured at room temperature.

FIGS. 4A-C present comparative plots of cell voltage and envelope temperatures measured for a commercial HCB cell and for E1 exemplary cell, according to some embodiments of the present invention, at a constant 1 W (FIG. 4A), 3 W (FIG. 4B) and 5 W (FIG. 4C).

As can be seen in FIG. 3 and FIGS. 4A-C, the E1 cell demonstrated unprecedented capability to deliver higher energy, an order of magnitude higher than a standard HCB cell when discharged on high power rates.

The observed temperature rise rates were higher on the surface of the standard HCB cell, as it was most evident at the 1 W discharge rate, due to the longer discharge time that enabled more heat to flow from the core of the cell to its surface. It is another indication that heat, which is known to improve cell performance for this type of primary cells, is better preserved at the core of the cell due to the larger number of electrodes set segments and larger number of their folds, providing better heat insulation for the cell.

Example 3

Discharge Efficiency

Typically, a $Li/MnO_2$ cell discharge profile follow three stages of $MnO_2$ formula reduction by insertion of lithium ions into the lattice of the $MnO_2$ cathode. The initial stage of the reduction of the $MnO_2$ occurs within approximately the first 10% of discharge. It involves the insertion of lithium ions into the lattice of the $MnO_2$ forming $Li_xMnO_2$ ($0<x<0.1$), which is typical of a homogeneous reaction. The next step in the discharge involves a heterogeneous or two-phase reaction. It is distinguished by the flat portion of the $Li/MnO_2$ discharge curve, forming $Li_xMnO_2$ ($0.1<x<0.4$). The final discharge regime is again a homogeneous reaction. This reaction involves insertion of lithium ions into the new structural form of $Li_xMnO_2$ ($>0.4$) and accounts for the final sloping section of the discharge curve.

The $Li/MnO_2$ cell open circuit potential (OCP) is 3.1-3.2 V and the IR drop in potential upon cell discharge initiation is related to activation over-potential. The relatively modest drop in potential within the first 10% of the discharge, which is exhibited by the exemplary E1 cell, constructed according to some embodiments of the present invention, is related to a homogeneous phase formation follow by two heterogeneous phases formed. The continuous decline in cell potential is attributed to the formation of a homogeneous phases again, leading to complete phase formation of $LiMnO_2$ and finally the cell potential drop due to complete phase transfer (leading to mass transport control).

Discharge Performance:

Galvanostatically (constant current mode) discharge performances at current demands of 0.5 A, 1.25 A and 2.5 A of cells constructed according to embodiments of the present invention, compared to traditional comparable cells of the same dimensions are shown in FIGS. 5A-B.

FIGS. 5A-B present cell voltage (V) vs. capacity (mAh) of an exemplary E1 cell, constructed according to some embodiments of the present invention (FIG. 5A) and standard commercial HCB cell (FIG. 5B) measured at constant currents of 500, 1250 and 2500 mA, wherein the cells' nominal capacity is 775±25 mAh (maximal actual capacity at 1 mA drain down to a 2 V cutoff potential).

As can be seen in FIGS. 5A-B, the E1 cell is "pulling" itself out of the potential IR drop, occurring after 20-30 mAh of discharge. After the IR drop, the cell potential is unexpectedly lifted up by 20-70 mV, depending on the applied current density, and this allows a sustainable cell discharge. The IR drop is greater as the current demand is higher and so is the potential lift-off. It is unexpected that the cell would utilize about 50% of its theoretical or nominal capacity upon discharging at a current density of 2.5 A. In contrast, the standard cell was able to deliver at the best 20% of the nominal capacity at a much lower current of 0.5 A, compared with about 70% obtained in the E 1 cell under the same current load, but failed at large once discharged at currents of 1.25 (only 32 mAh) and 2.5 Amp (only 5.5 mAh).

Table 2 presents cell discharge data while comparing the exemplary E 1 cell, constructed according to some embodiments of the present invention, to the standard HCB-CP224147 cell, having the same amount of anode and cathode active materials. The cells were drained to 2 V cut-off voltage at 500 mA (C rate of about C/1.6), 1,250 mA (C rate of about 1.55 C) and 2,500 mA (C rate of about 3.125 C), at room temperature, until reaching cut-off voltage. The nominal capacity of the cells ranges from 750 mAh to 800 mAh, and is taken herein at the high end of the range.

TABLE 2

| | Embodiment 1 (E1) cell (Nominal capacity 800 mAh) | | | | Commercial HCB-CP224147 cell (Nominal capacity 800 mAh) | | | |
|---|---|---|---|---|---|---|---|---|
| Discharge current | Actual capacity | Av. Voltage | Current density (mA/cm$^2$) | Discharge efficiency | Actual capacity | Av. Voltage | Current density (mA/cm$^2$) | Discharge efficiency |
| 500 mA | 547 mAh | 2.5 V | 4.4-4.5 | 68% | 163 mAh | 2.3 V | 11-12 | 20% |
| 1,250 mA | 507 mAh | 2.35 V | 11-12 | 63% | 32 mAh | N/A | 29-30 | 4% |
| 2,500 mA | 385 mAh | 2.3 V | 22-23 | 49% | 5.5 mAh | N/A | 58-60 | <1% |

As can be seen in Table 2, the E 1 cell constructed according to some embodiments of the present invention exhibited far better discharge efficiency than the comparable standard HBC cell, reaching up to 50% efficiency at the exceedingly high discharge rate of 2.5 A, at which the standard cell could deliver less than 1% of its stored capacity.

Example 4

Current Density and Heat Impact

The following example is designed to compare the impact of current density on cell performance. Improvement in cell performance can be assessed by comparing performances based on geometrical current density.

The results presented below are surprising and unexpected. It is noted herein that the average potential at a drain rate of 1,250 mA of a cell constructed according to embodiments of the present invention, having a current density of 11 mA/cm$^2$, is 2.35 V, providing a capacity of 507 mAh, as measured up to a cutoff potential of 2 V. The comparable standard HCB cell discharged at 500 mA (corresponding to the same current density as the E1 cell discharged at 1,250 mA), was discharged at a current density of 12 mA/cm$^2$, yielded an average potential of 2.3 V and overall capacity of only 163 mAh, as shown in FIG. 6.

FIG. 6 presents a comparative plot of discharge profile voltage (V) vs. capacity (mAh) of E1 cell, constructed according to embodiments of the present invention, compared to a standard HCB cell, wherein the two cells are being discharged at the same current density of 12 mA/cm$^2$, showing that the E1 cell is discharged at 1250 mA and the HCB cell discharged at 500 mA.

As can be seen in FIG. 6, the two cells behaved the same within the first 25 mAh—both were dropping in potential from open circuit voltage (3.2 V) to 2.4 V. For the HCB cell it took 176 seconds, while for the E1 cell it took 59 seconds. At this point the behavior of the E1 cell is surprising and unexpected, as it is able to "pulls" itself out of the IR drop, and the potential reached a voltage of close to 2.49 V. The E1 cell reaches its maximal potential when utilizing 150-165 mAh, while at this capacity the HCB cell reached its cutoff voltage of 2 V, and a potential gap of 480 mV was recorded at that stage.

Cell's Core Heat:

The cell constructed according to embodiments of the present invention, was
- found to have a self-sustained power mechanism that is not related to the current density being applied. It is noted that in all current densities applied to the E1 cell, the recovery from the voltage dip occurred at the same capacity of about 25 mAh. Therefore, it is postulated that the E 1 cell has an "internal booster", pushing the cell potential up, allowing a sustainable power capabilities. Such a power booster can emerge from a residual heat being captured in the cell's core segments. As the number of segments is 4 or more, up to and reaching to 8-10, and the overall current is increased, the overall heat produced according to I$^2$R is being maintained in the core of the thin segments. This, in turn results in a substantial increase of the internal temperature of the cell, pushing up the operational temperature of the cell.

Hence, the evidence that thinning as well as additional folding and windings of the electrodes set, according to embodiments of the present invention, is found in the behavior of the cell at the IR drop. Based on the results shown herein and the presently available knowledge in the art, it is postulated that the presently disclosed cell's inner core temperature is actually being raised to above 60-70° C.

Thus, thinning the electrode has an effect which goes beyond the expected increase in electrode active area, and which has not been foreseen.

Capacity Fading Characteristics:

Fitting a linear slope to each of the curves presented in FIGS. 5A-B reveals the capacity fading characteristics of the cells at different current densities.

The E1 cell's potential fading is substantially lower than potential fading of traditional cells. Surprisingly, the potentials at currents of 500-1250 mA are preserved for a long discharged capacity (time) and stands on low fading values of 0.25-0.45 m V/mAh, which is as low as the fading observed in discharging traditional standard cells at current densities of 1-10 mA (data provided by the HCB cell's manufacturer). The HCB cell's potential fading rate is higher by 10 to 50 times at current loading of 500 to 1250 mA, respectively. This is an advantage that could not be foreseen since the expectation based on known primary cell behavior was that this value will be greater than 1 m V/mAh at these currents and current densities.

Example 5

Real Life Performance

In the following example an exemplary cell, constructed according to embodiments of the present invention, was put to the practical usages test of charging two popular models of cellular phones, the iPhone S4 and the Galaxy S4.

Smartphone Recharging Task:

FIGS. 7A-B present comparative voltage vs. time plots of measurements
- recorded during a continuous 1.3 A discharge of an E1 cell and an HCB cell while charging an iPhone S4 (FIG. 7 A) and a Galaxy S4 (FIG. 7B) smartphones.

As can be seen in FIGS. 7A-B. the E1 cell was able to sustain a constant current load of 1.3 A for more than 22 minutes, while the standard HCB cell was able to sustain such high load for less than 3 minutes. Practically, the cell constructed according to embodiments of the present invention is at least 7 times more "energetic" than the traditional commercial cell.

FIG. 8 presents comparative current vs. time plots of measurements recorded while charging a Galaxy S4 smartphone using an E1 cell and an HCB cell, wherein the discharge was conducted at a constant power of 2.4 W applied until the cell either a current higher than 1.3 A or a cut-off voltage of 2 V.

As can be seen in FIG. 8, comparing the cells at constant power charging mode,
- as required by the cellular device, the difference in performance of the two types of cells becomes more pronounced, and that is since charging at a constant power is the most demanding procedure that can be imposed on a primary cell. It is therefore demonstrate that while a traditional cell fails short of 2 minutes of discharge, a cell constructed according to embodiments of the present invention is able to sustain an operational charging time of more than 12 minutes. This is an impressive seven-fold in energy support under a constant power load of 2.4 W.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed as new and desired to be protected by Letters Patent of the United States is:

1. A primary electrochemical cell, comprising a cathode having a cathode geometric volume and a cathode active area, an anode having an anode geometric volume and an anode active area, and at least two separators, wherein at least one of said separators is disposed at least between a portion of the cathode active area and a portion of the anode active area, and said anode and cathode are folded to thereby form a plurality of segments, wherein:
    a ratio of a nominal capacity of the cell to said active area is lower than 12 mAh/cm$^2$;
    a ratio of at least one of the anode geometric volume and the cathode geometric volume to the anode active area and the cathode active area, respectively, is less than $195.5 \times 10^{-6}$ cm.

2. The cell of claim 1, wherein a ratio mass equivalent of said anode to said cathode ranges from 1.5 to 0.9.

3. The cell of claim 1, wherein a thickness of said cathode is less than 200+/−5 microns.

4. The cell of claim 1, wherein a width of said anode or said cathode ranges from 60 mm to 20 mm.

5. The cell of claim 1, wherein said anode and cathode are folded in a flattened jellyroll configuration.

6. The cell of any one of claim 1, wherein each of said segments is substantially rectangular.

7. The cell claim 1, wherein at least one of said anode or cathode is folded into at least 5 segments.

8. The cell of claim 1, wherein said nominal capacity of the cell is 775+/−25 mAh.

9. The cell of claim 1, wherein the cell is encased in a sealed container.

10. The cell of claim 9, wherein said container is heat insulating.

11. The cell of claim 1, wherein an anode active material comprises at least one of lithium, aluminum, silicon, carbon, zinc, and alloys and/or combinations thereof.

12. The cell of claim 1, wherein a cathode active material comprises at least one of $MnO_2$, $FeS_2$, $CoO_2$, $NiMnCoO_2$, $FePO_4$, $NiCoAlO_2$, $Ti_5Oi_2$, CFX (mono fluorinated carbon), and alloys, and/or combinations thereof.

13. The cell of claim 1, wherein the ratio of a nominal capacity of the cell to said active area ranges from 12 mAh/cm$^2$ to 5 mAh/cm$^2$.

14. The cell of claim 1, wherein the cell is characterized by a discharge efficiency at room temperature of at least 30% to a cut-off voltage of ⅔ of an original voltage at a discharge current of 1,250 m A.

15. The cell of claim 1, wherein said anode is folded into at least 4 segments and said cathode is folded into fewer segments than the anode and an inner segment consists of an anode segment.

16. The cell of claim 4, wherein a length of said cathode is at least 110+/−2 mm.

17. The cell of claim 1, wherein a thickness of said anode is 130+/−5 microns or less.

18. The cell of claim 1, wherein an anode active material is lithium.

19. The cell of claim 1, wherein a cathode active material is $MnO_2$.

20. A power storage device, comprising at least one primary electrochemical cell of claim 1, further comprising at least two contact terminals in conductive communication with each of said anode and said cathode, respectively.

21. The device of claim 20, further configured for charging a secondary battery in a portable electronic device.

* * * * *